(12) United States Patent
Kim et al.

(10) Patent No.: US 12,056,286 B2
(45) Date of Patent: Aug. 6, 2024

(54) ELECTRONIC DEVICE FOR PROVIDING AUGMENTED REALITY SERVICE AND OPERATING METHOD THEREOF

(71) Applicant: SAMSUNG ELECTRONICS CO., LTD., Suwon-si (KR)

(72) Inventors: Jieun Kim, Suwon-si (KR); Jongwoo Jung, Suwon-si (KR); Inyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/985,776

(22) Filed: Nov. 11, 2022

(65) Prior Publication Data

US 2023/0074380 A1    Mar. 9, 2023

Related U.S. Application Data

(63) Continuation of application No. PCT/KR2021/005688, filed on May 6, 2021.

(30) Foreign Application Priority Data

May 13, 2020    (KR) .......................... 10-2020-0056985

(51) Int. Cl.
*G06F 3/01*    (2006.01)
*G06T 7/11*    (2017.01)
(Continued)

(52) U.S. Cl.
CPC ................ *G06F 3/017* (2013.01); *G06T 7/11* (2017.01); *G06T 7/70* (2017.01); *G06V 10/22* (2022.01);
(Continued)

(58) Field of Classification Search
CPC ........ G06F 3/017; G06F 3/011; G06F 3/0481; G06F 3/005; G06T 7/11; G06T 7/70; (Continued)

(56) References Cited

U.S. PATENT DOCUMENTS 8,482,527 B1 *   7/2013   Kim ........................ G06F 3/017
                                                              715/773
9,442,575 B1 *   9/2016   Kandadai ................ G06F 3/017
(Continued)

FOREIGN PATENT DOCUMENTS

EP         3065042 A2 *   9/2016   ........... B64C 39/024
JP         2016-177658       10/2016
(Continued)

OTHER PUBLICATIONS

International Search Report for PCT/KR2021/005688 dated Aug. 12, 2021, 5 pages.
(Continued)

*Primary Examiner* — Grant Sitta
(74) *Attorney, Agent, or Firm* — Nixon & Vanderhye P.C.

(57) ABSTRACT

An apparatus and/or method for providing an augmented reality service in an electronic device. The electronic device may include a memory configured to store first gesture information and second gesture information, a camera, a display, and a processor, wherein the processor may be configured to detect a gesture on the basis of image information obtained via the camera, identify the gesture on the basis that a detection location of the gesture is included in a first region different from a second region corresponding to a viewing angle of a user wearing the electronic device, from among the image information obtained via the camera, output a first visual effect related to the gesture via the display when the gesture corresponds to the first gesture information, and output guide information related to the
(Continued)

gesture via the display when the gesture corresponds to the second gesture information. Other embodiments may also be possible.

11 Claims, 23 Drawing Sheets

(51) Int. Cl.
    *G06T 7/70*         (2017.01)
    *G06V 10/22*      (2022.01)
    *G06V 40/20*      (2022.01)

(52) U.S. Cl.
    CPC .... *G06V 40/20* (2022.01); *G06T 2207/20021* (2013.01)

(58) Field of Classification Search
    CPC .......... G06T 2207/20021; G06T 19/00; G06T 19/006; G06V 10/22; G06V 40/20
    See application file for complete search history.

(56) References Cited

U.S. PATENT DOCUMENTS

| | | | |
|---|---|---|---|
| 9,690,371 | B2 | 6/2017 | Saito |
| 10,268,276 | B2 | 4/2019 | Fisher et al. |
| 10,860,088 | B2 | 12/2020 | Andrew et al. |
| 11,294,472 | B2 | 4/2022 | Tang et al. |
| 2008/0129686 | A1* | 6/2008 | Han ...................... G06F 3/0485 345/156 |
| 2012/0162409 | A1* | 6/2012 | Setiawan ................ G06F 3/011 348/135 |
| 2013/0201104 | A1* | 8/2013 | Ptucha .................... G06F 3/017 345/158 |
| 2014/0037134 | A1* | 2/2014 | Tong .................... G06V 40/161 382/103 |
| 2014/0191943 | A1 | 7/2014 | Lee et al. |
| 2016/0179211 | A1* | 6/2016 | Katz ....................... G06F 3/017 715/779 |
| 2016/0274732 | A1* | 9/2016 | Bang ....................... G06F 3/017 |
| 2016/0334875 | A1* | 11/2016 | Kandadai ................ G06F 3/017 |
| 2017/0010676 | A1* | 1/2017 | Putman .................. G06F 3/017 |
| 2018/0109724 | A1 | 4/2018 | Kang et al. |
| 2019/0221044 | A1 | 7/2019 | Motta et al. |
| 2019/0384405 | A1 | 12/2019 | Iyer et al. |
| 2021/0191526 | A1 | 6/2021 | Heo et al. |

FOREIGN PATENT DOCUMENTS

| | | |
|---|---|---|
| JP | 2017-83916 | 5/2017 |
| KR | 10-2012-0062168 | 6/2012 |
| KR | 10-2014-0089858 | 7/2014 |
| KR | 10-2016-0137253 | 11/2016 |
| KR | 10-1751238 | 7/2017 |
| KR | 10-2018-0043098 | 4/2018 |
| KR | 10-1861096 | 5/2018 |
| KR | 10-2018-0113115 | 10/2018 |
| KR | 10-2020-0028771 | 3/2020 |

OTHER PUBLICATIONS

Written Opinion of the ISA for PCT/KR2021/005688 dated Aug. 12, 2021, 4 pages.

\* cited by examiner

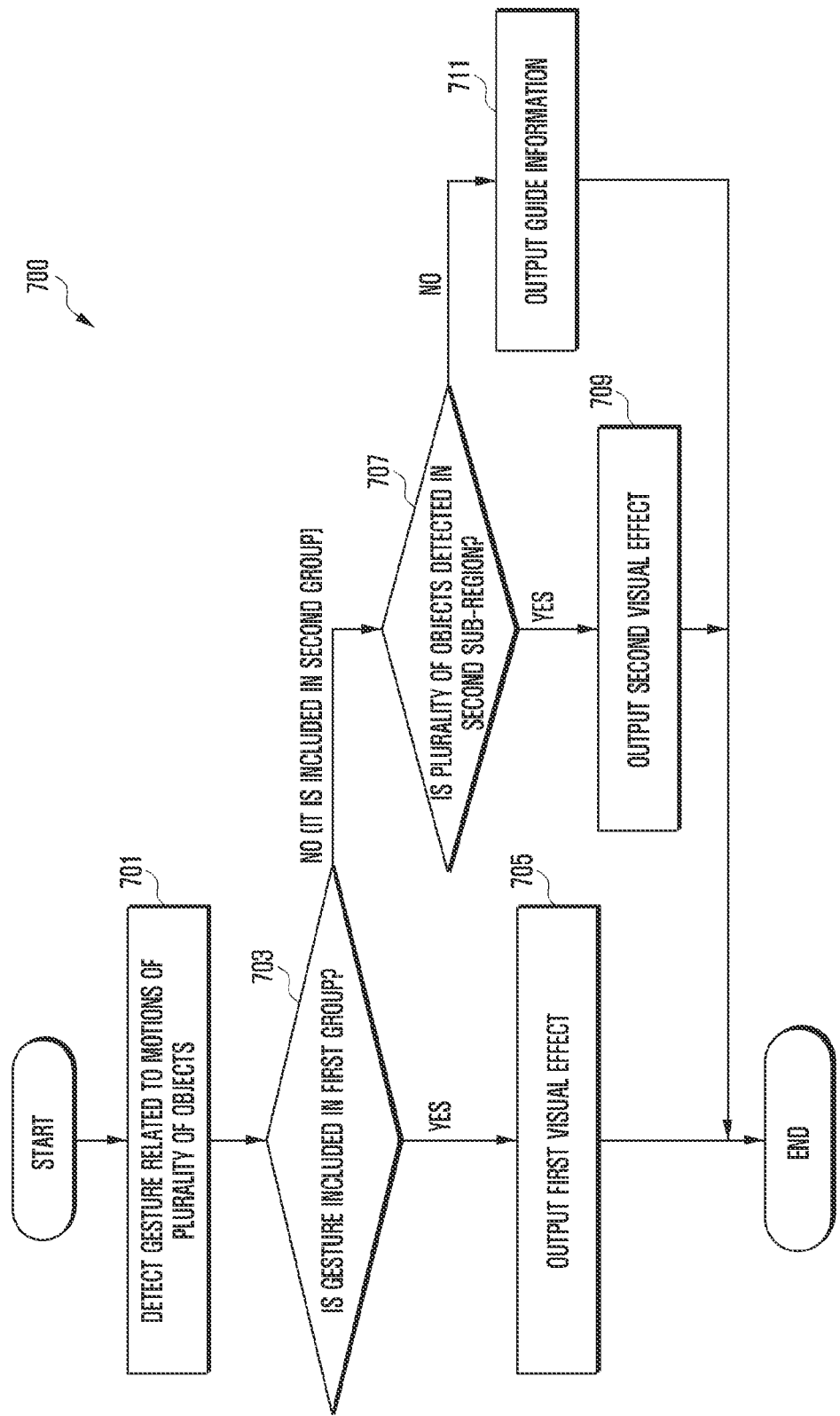

ELECTRONIC DEVICE FOR PROVIDING AUGMENTED REALITY SERVICE AND OPERATING METHOD THEREOF

CROSS-REFERENCE TO RELATED APPLICATIONS

This application is a continuation of International Application No. PCT/KR2021/005688 designating the United States, filed on May 6, 2021, in the Korean Intellectual Property Receiving Office and claiming priority to Korean Patent Application No. 10-2020-0056985, filed on May 13, 2020, in the Korean Intellectual Property Office, the disclosures of which are all hereby incorporated by reference herein in their entireties.

BACKGROUND

Field

Certain example embodiments relate to an apparatus and/or a method for providing an augmented reality service in an electronic device.

Description of Related Art

In line with the development of information and communication technology and semiconductor technology, various electronic devices are developing into multimedia devices that provide various multimedia services. Multimedia services may include at least one of a voice call service, a messaging service, a broadcast service, a wireless Internet service, a camera service, an electronic payment service, and a music reproduction service.

Electronic devices may provide users with various types of experiences. For example, electronic devices may provide various types of experiences to the user, based on an augmented reality (AR) service in which virtual information (e.g., virtual objects) is added to a real space.

SUMMARY

Augmented reality devices may display virtual information such that virtual information (e.g., virtual objects) is superimposed on at least a partial region of a real space determined to be a user's field of view.

Augmented reality devices may control augmented reality services, based on gestures obtained through a camera module. For example, a user wearing an augmented reality device may control virtual information displayed on at least a partial region of a real space determined as a user's field of view using user's hands rather than a separate input device such as a keyboard or mouse.

Augmented reality devices may configure a gesture recognition range to be wider than at least a partial region of the real space determined as the user's field of view. In this case, the augmented reality device requires a method for processing a gesture recognized at a point outside at least a partial region of the real space determined as the user's field of view.

Various example embodiments relate to an apparatus and/o a method for processing a gesture detected outside a displayable area for virtual information (e.g., virtual object (s)) in an electronic device.

According to various example embodiments, an electronic device may include a memory configured to store first gesture information and second gesture information, a camera module comprising a camera, a display device comprising a display, and a processor operatively connected to the memory, the display device, and the camera module, wherein the processor may be configured to detect a gesture, based on image information obtained via the camera module, identify the gesture, based on the case where a detection location of the gesture is included in a first region different from a second region corresponding to a field of view of a user wearing the electronic device, among the image information obtained via the camera module, if the gesture corresponds to the first gesture information, control the display device to output a first visual effect related to the gesture, and if the gesture corresponds to the second gesture information, control the display device to output guide information related to the gesture.

According to various example embodiments, an operation method of an electronic device may include detecting a gesture, based on image information obtained through a camera module of the electronic device, identifying the gesture, based on the case where a detection location of the gesture is included in a first region different from a second region corresponding to a field of view of a user wearing the electronic device, among the image information obtained through the camera module, if the gesture corresponds to first gesture information, outputting a first visual effect related to the gesture, and if the gesture corresponds to second gesture information different from the first gesture information, outputting guide information related to the gesture.

According to various example embodiments, if an electronic device detects a gesture at a location outside a region capable of displaying virtual information (e.g., virtual object (s)) related to an augmented reality service, the electronic device may output a visual effect and/or guide information related to the gesture, based on the characteristics of the gesture, thereby providing guide information on a gesture required to change an input location to the user wearing the electronic device.

BRIEF DESCRIPTION OF DRAWINGS

This method and the device illustrated in the accompanying drawings, throughout which reference letters indicate corresponding parts in the various figures. Certain example embodiments herein will be better understood from the following description with reference to the drawings, in which:

FIG. 7 is a flowchart illustrating selective output of guide information, based on a group and location of a gesture in an electronic device, according to various example embodiments.

DETAILED DESCRIPTION

Hereinafter, various example embodiments will be described in detail with reference to the accompanying drawings.

Figure 1:
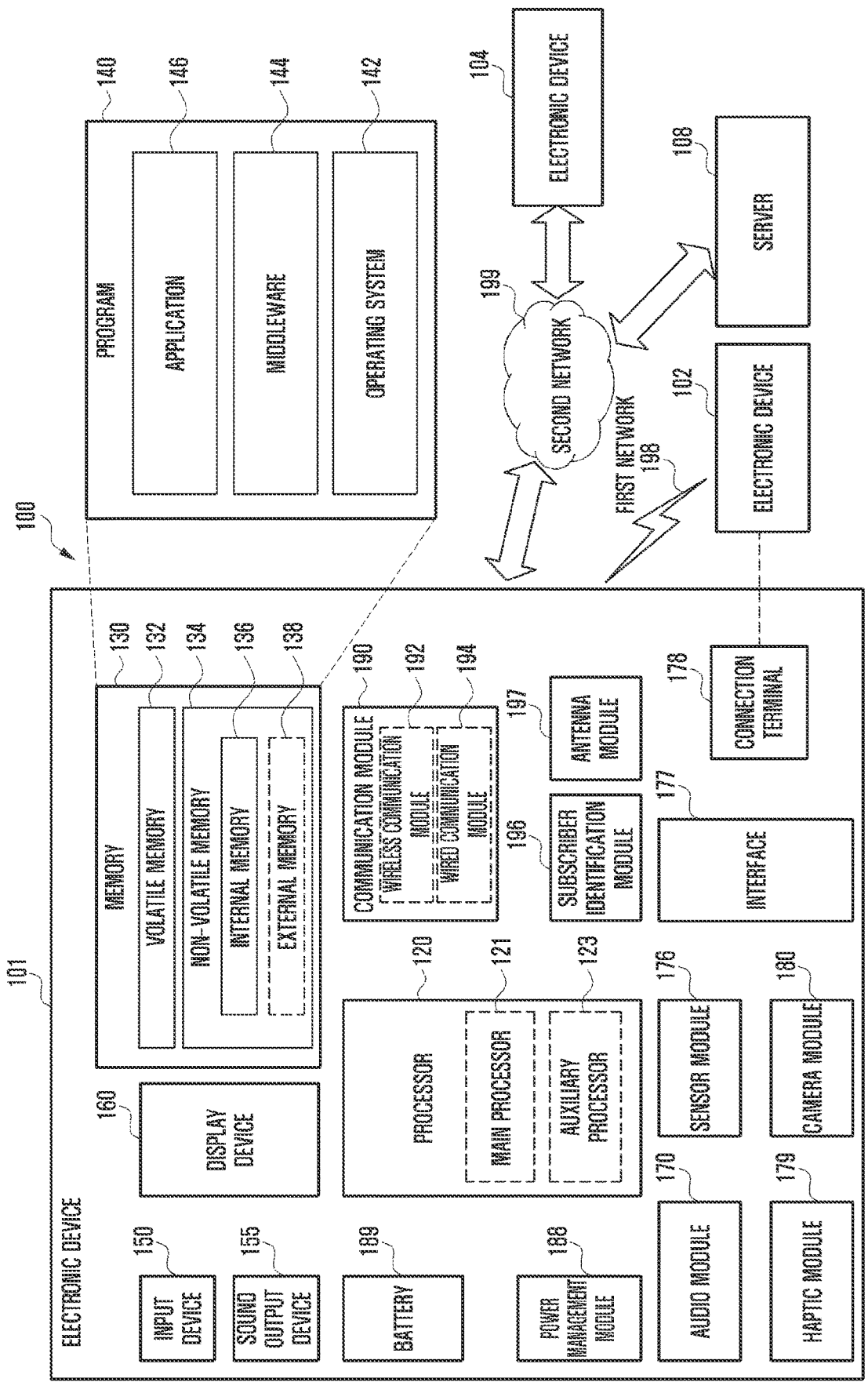
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch. According to an embodiment, the display device 160 may be formed of a transparent element. For example, when the display device 160 is formed of a transparent element, the user may recognize an actual space (or real world) of the rear surface of the display device 160 through the display device 160. The display device 160 may display the virtual object on at least a portion of the transparent element so that the user of the electronic device 101 sees the virtual object as being added to at least a portion of the real space.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via at least a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
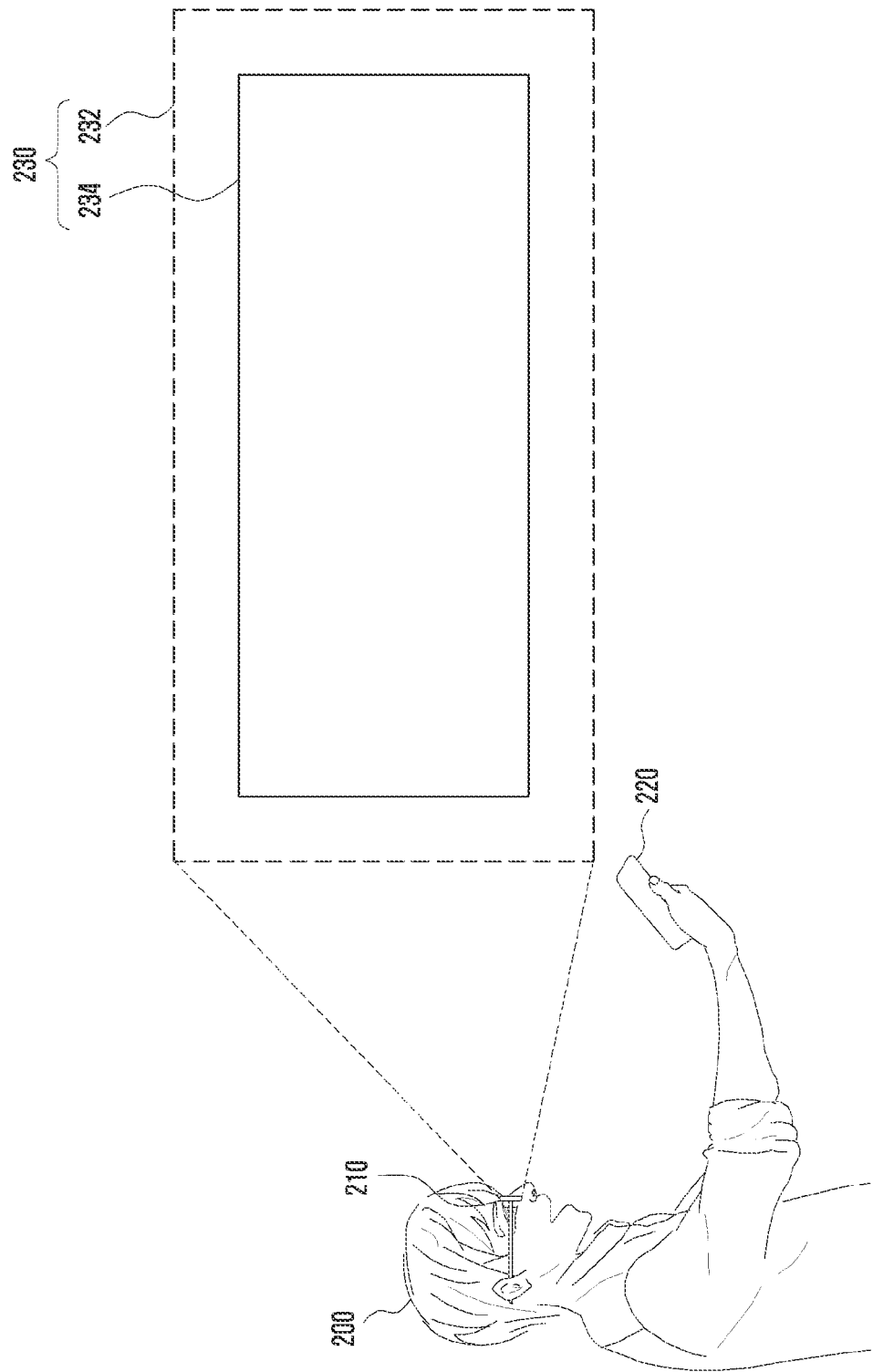
FIG. 2A illustrates an example of an electronic device worn on a user according to various example embodiments.

FIG. 2A illustrates an example of an electronic device worn on a user according to various embodiments.

Referring to FIG. 2A, according to various embodiments, an electronic device 210 may be worn on the head of a user 200 to provide the user 200 with an image related to an augmented reality service. According to an embodiment, the electronic device 210 may provide an augmented reality service in which at least one virtual object is output so as to be superimposed on a region determined as a field of view (FoV) of the user 200. As an example, the region determined as the field of view of the user 200 is a region that is determined to be recognizable by the user 200 wearing the electronic device 210 through the electronic device 210, and may include all or at least a portion of the display region of the electronic device 210. As an example, the electronic device 210 may determine that the user 200 wearing the electronic device 210 is unable to recognize a virtual object displayed at a point outside the region determined as the field of view. Accordingly, the region determined as the field of view of the user 200 may be determined as a displayable region for virtual objects. As an example, the region determined as the field of view of the user 200 may be configured based on the size and shape of a display device (e.g., the display device 215 in FIG. 2B) of the electronic device 210 on which the virtual object is displayed, and/or disposition information (e.g., distance and/or direction) between the eyes of the user 200 wearing the electronic device 210 and the display device. As an example, the electronic device 210 may be configured in the form of at least one of glasses, goggles, a helmet, or a hat, but is not limited thereto.

According to an embodiment, a virtual object output from the electronic device 210 may include information related to an application program executed in the electronic device 210 and/or information related to external objects located in a real space corresponding to a region determined as a field of view (FoV) of the user. For example, the electronic device 210 may identify an external object included in at least a portion corresponding to the region determined as the user's field of view (FoV) from image information related to a real space obtained through a camera (e.g., the camera module 180 in FIG. 1) of the electronic device 210. The electronic device 210 may output (or display) a virtual object related to the external object identified at least in the portion through the region determined as the user's field of view in the display region of the electronic device 210. As an example, the external object may include things that exist in the real space.

According to an embodiment, the electronic device 210 may detect a gesture related to an augmented reality service, based on image information related to a real space obtained via a camera (e.g., the camera module 180 in FIG. 1) of the electronic device 210. Accordingly, the electronic device 210 may determine the region of the real space corresponding to the image information obtained through the camera to be a gesture recognition region 230. The electronic device 210 may divide the gesture recognition region 230 into a first sub-region 232 and a second sub-region 234, based on the region determined as the user's field of view. As an example, the gesture recognition region 230 may be configured based on a photographable range of the camera (e.g., an angle of view of the camera). As an example, the first sub-region 232 may include the remaining regions, excluding the region determined as the user's field of view, from the gesture recognition region 230 in which the image information is obtained via the camera. As an example, the second sub-region 234 may include a partial region corresponding to the region determined as the user's field of view in the gesture recognition region 230 in which the image information is obtained through the camera.

According to an embodiment, if a gesture related to an augmented reality service is detected in the second sub-region 234, the electronic device 210 may output a visual effect related to the gesture to the region determined as the user's field of view. For example, the visual effect related to the gesture may include a visual effect related to recognition of the gesture and/or a visual effect related to execution of a function related to the gesture.

According to an embodiment, if a gesture related to an augmented reality service is detected in the first sub-region 232, the electronic device 210 may output a visual effect related to the gesture, based on the correlation between the gesture and a virtual object. For example, if the gesture detected in the first sub-region 232 is included in a first group, the electronic device 210 may output a visual effect related to recognition of the gesture and/or execution of a function related to the gesture. For example, if the gesture detected in the first sub-region 232 is included in a second group, the electronic device 210 may output a visual effect related to a location change of the gesture. As an example, the first group may include at least one first gesture to which a function (e.g., going to home, executing an application, and/or changing a mode), which is not related to a virtual object, is mapped. As an example, the second group may include at least one second gesture to which a function (e.g., selecting, moving, enlarging, reducing, or changing an angle), which is related to control of a virtual object, is mapped.

According to various embodiments, the electronic device 210 may provide an augmented reality service, based on control of another electronic device 220 connected through wireless and/or wired communication. According to an embodiment, the electronic device 210 may transmit image information of the real space obtained through the camera (e.g., the camera module 180 in FIG. 1) of the electronic device 210 to another electronic device 220. Another electronic device 220 may transmit, to the electronic device 210, information related to at least one virtual object detected based on the image information received from the electronic device 210. The electronic device 210 may output at least one virtual object to a region determined as the user's field of view, based on the information related to at least one virtual object, which is received from another electronic device 220. As an example, the information related to a virtual object may include at least one of a shape (or form), color, size, or location of the virtual object. As an example, another electronic device 220 may include a portable communication device (e.g., a smartphone), a computer device, an external server (e.g., the server 108 in FIG. 1), and/or a portable multimedia device.

Figure 2B:
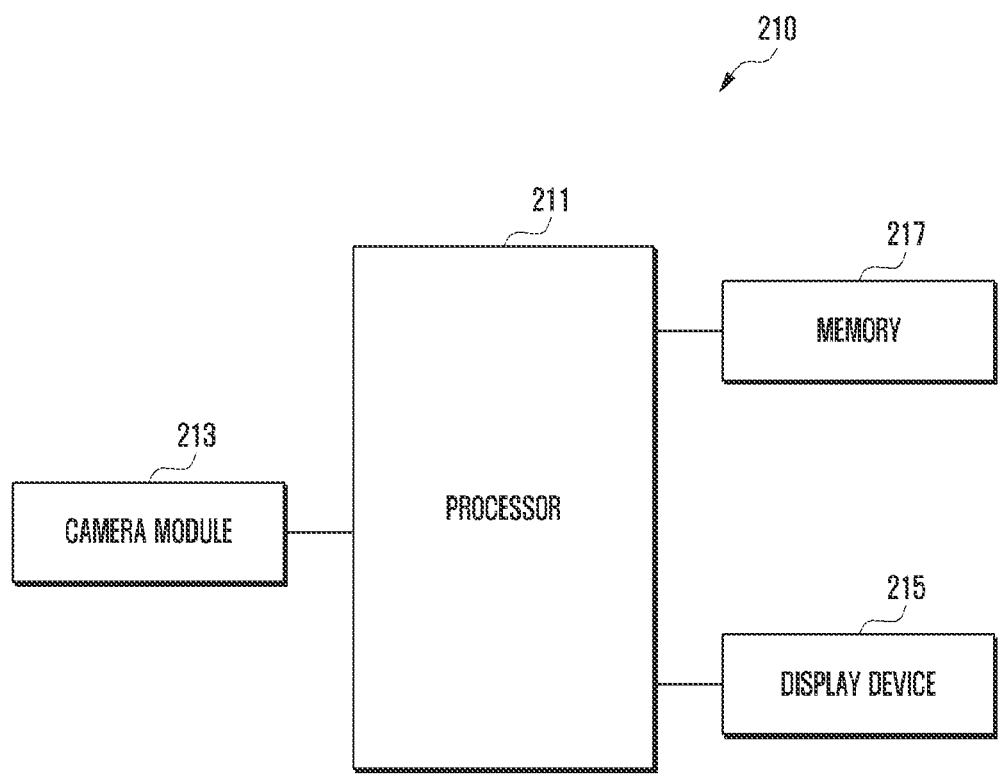
FIG. 2B is a block diagram of an electronic device for providing an augmented reality service according to various example embodiments.

FIG. 2B is a block diagram of an electronic device for providing an augmented reality service according to various embodiments. As an example, the electronic device 210 may be at least partially similar to the electronic device 101 in FIG. 1 or the electronic device 210 in FIG. 2A, or may include another embodiment of the electronic device.

Referring to FIG. 2B, according to various embodiments, the electronic device 210 may include a processor 211, a camera module 213, a display device 215, and/or a memory 217. According to an embodiment, the processor 211 may be substantially the same as the processor 120 in FIG. 1 or may be included in the processor 120. The camera module 213 may be substantially the same as the camera module 180 in FIG. 1 or may be included in the camera module 180. The display device 215 may be substantially the same as the display device 160 in FIG. 1 or may be included in the display device 160. The memory 217 may be substantially the same as the memory 130 in FIG. 1 or may be included in the memory 130. According to an embodiment, the processor 211 may control at least one of a camera module 213, the display device 215, and the memory 217, which are operatively connected thereto.

According to various embodiments, the processor 211, comprising processing circuitry, may provide an augmented reality service. According to an embodiment, the processor 211 may output at least one virtual object through the display device 215 such that at least one virtual object is displayed so as to be added to a real space corresponding to the field of view of the user 200 wearing the electronic device 210. For example, the processor 211 may identify at least one external object included in the real space determined as the field of view of the user 200 wearing the electronic device 210, based on image information obtained through the camera module 213. The processor 211 may control the display device 215 to output at least one virtual object related to the external object obtained through the camera module 213. For example, the processor 211 may determine that a portion (e.g., the second sub-region 234 in FIG. 2A) of the region (e.g., the gesture recognition region 230 in FIG. 2A) in which image information is able to obtained through the camera module 213 corresponds to the region determined as the field of view of the user 200. The processor 211 may determine the region determined as the field of view of the user 200 in the display region of the display device 215 to be a region capable of displaying a virtual object. As an example, the display device 215 may output at least one virtual object in at least a partial region corresponding to the region determined to be the field of view of the user 200 wearing the electronic device 210 in the display region of the display device 215. As an example, the at least one virtual object may include at least one piece of information related to an external object located in a real space obtained through the camera module 213 and/or information related to an application executed in the electronic device 210.

According to various embodiments, the processor 211 may detect a gesture related to an augmented reality service through the camera module 213. According to an embodiment, the processor 211 may obtain motion information of an external object (e.g., a user's hand) in a gesture recognition region (e.g., the gesture recognition region 230 in FIG. 2A), based on the image information obtained through the camera module 213. If the motion information of the external object is included in a gesture list related to the augmented reality service stored in the memory 217, the processor 211 may determine that a gesture related to the augmented reality service has been detected. As an example, the gesture recognition region is a region in which image information is able to be obtained through the camera module 213, and may be configured based on the angle of view of the camera module 213. As an example, the gesture recognition region may include a first sub-region (e.g., the first sub-region 232 in FIG. 2A) corresponding to the remaining regions, excluding the region determined as the field of view of the user 200 (e.g., the displayable region for virtual objects) and a second sub-region (e.g., the second sub-region 234 in FIG. 2A) corresponding to the region determined as the field of view of the user 200.

According to various embodiments, the processor 211 may control the display device 215 to output a visual effect related to a gesture, based on a detection location of the gesture and/or the type of gesture (or a group including the gesture). According to an embodiment, if a gesture is detected in the first sub-region (e.g., the first sub-region 232 in FIG. 2A) of the gesture recognition region, the processor 211 may identify the type (or group) of the gesture. For example, if the gesture is included in a first group, the processor 211 may control the display device 215 to output a first visual effect related to the gesture. As an example, the first visual effect may be output (or displayed) onto at least a partial region relatively close to the recognition point of the gesture within the region determined as the field of view of the user 200 (e.g., the displayable region for the virtual object). As an example, the first visual effect may include at least one virtual object related to gesture recognition in the first sub-region and/or execution of a function mapped to the gesture. As an example, the first group may include at least one first gesture to which a function (e.g., going to home, executing an application, and/or changing a mode), which is not related to the virtual object, is mapped. For example, if the gesture is included in a second group, the processor 211 may control the display device 215 to output guide information related to the gesture. As an example, the guide information may be output (or displayed) onto at least a partial region relatively close to the recognition point of the gesture within the region determined as the field of view of the user 200 (e.g., the displayable region for the virtual object). As an example, the second group may include at least one second gesture to which a function (e.g., selecting, moving, enlarging, reducing, or changing an angle) related to control of the virtual object is mapped. As an example, the guide information may include a virtual object related to a locational movement (e.g., a movement direction and/or a movement distance) of an external object related to the gesture recognized in the first sub-region.

According to an embodiment, if a gesture is detected in the second sub-region (e.g., the second sub-region 232 in FIG. 2A) of the gesture recognition region, the processor 211 may control the display device 215 to output a second visual effect related to the gesture. As an example, the second visual effect may at least partially overlap the external object related to a gesture or may be displayed based on the location of a virtual object related to the gesture. As an example, the second visual effect may include at least one virtual object related to recognition of a gesture in the second sub-recognition region and/or execution of a function mapped to the gesture. As an example, the virtual object related to the recognition of a gesture may include a virtual object indicating at least one of a detection location of the gesture and/or whether or not the gesture is recognized. As an example, the virtual object related to the execution of a function mapped to the gesture may include a virtual object related to at least one of the type of function performed based on the gesture or the start of the function.

According to an embodiment, if a plurality of external objects (e.g., a plurality of hands) related to a gesture is detected in the first sub-region, the processor 211 may control the display device 215 to output visual effects related to the external objects, based on the type (or group) of the gesture. For example, if the gesture is included in the first group, the processor 211 may control the display device 215 to output a first visual effect related to each external object. For example, if the gesture is included in the second group, the processor 211 may control the display device 215 to output guide information related to each external object.

According to an embodiment, if a plurality of external objects (e.g., a plurality of hands) related to a gesture is detected in the second sub-region (e.g., the displayable region for a virtual object), the processor 211 may control the display device 215 to output a plurality of second visual effects related to the gesture so as to at least partially overlap the respective external objects.

According to an embodiment, if at least one external object among a plurality of external objects related to a gesture is detected in the first sub-region and if at least one remaining external object is detected in the second sub-region, the processor 211 may identify the type (e.g., the group) of gesture. For example, if the gesture is a first gesture included in the first group, the processor 211 may control the display device 215 to output a first visual effect related to at least one external object and a second visual effect related to at least one remaining external object. For example, if the gesture is a second gesture included in the second group, the processor 211 may control the display device 215 to output guide information related to at least one external object and a second visual effect related to at least one remaining external object.

According to various embodiments, the processor 211 may execute at least one function related to a gesture. According to an embodiment, if a first gesture included in the first group is detected, the processor 211 may execute a function related to the first gesture. For example, the processor 211 may execute a function related to the first gesture, regardless of the detection location of the first gesture. As an example, the first gesture included in the first group may include a gesture to which a function not related to control of a virtual object, such as going to home, executing an application, and/or changing a mode, is mapped. According to an embodiment, if a gesture is detected in the second sub-region, the processor 211 may execute a function related to the gesture. For example, if a gesture is detected in the second sub-region, the processor 211 may execute a function related to the gesture, regardless of the type (e.g., the group) of the gesture.

According to various embodiments, the camera module 213, comprising a camera, may photograph a still image and/or a video related to a real environment corresponding to the field of view of the user wearing the electronic device 210. According to an embodiment, the camera module 213 may include at least one camera for obtaining a real-time image corresponding to the field of view of the user wearing the electronic device 210. For example, the camera module 213 may include a first camera (e.g., a red-green-blue (RGB) camera or a depth camera) for obtaining information related to a motion (e.g., a gesture) of an external object in a real space corresponding to the field of view of the user 200 wearing the electronic device 210 and a second camera (e.g., a simultaneous localization-and-mapping (SLAM) camera) for recognizing information (e.g., location and/or direction) related to the surrounding space of the electronic device 210 (or the user). As an example, the gesture recognition region (e.g., the gesture recognition region 230 in FIG. 2A) may be configured based on a wider photographable range (e.g., the angle of view of the camera) among the photographable ranges of the first camera and second camera. As another example, the gesture recognition region (e.g., the gesture recognition region 230 in FIG. 2A) may be configured based on a photographable range of the first camera (e.g., the angle of view of the camera). For example, the camera module 213 may include a third camera in which the first camera (e.g., a red-green-blue (RGB) camera or a depth camera) and the second camera (e.g., a simultaneous localization-and-mapping (SLAM) camera) are integrated. As an example, the gesture recognition region (e.g., the gesture recognition region 230 in FIG. 2A) may be configured based on a photographable range of the third camera (e.g., the angle of view of the camera).

According to various embodiments, the display device 215, comprising a display, may display information processed by the electronic device 210. According to an embodiment, the display device 215 may be configured as a transparent element so that the user 200 wearing the electronic device 210 is able to recognize the real space through the display device 215. The display device 215 may display at least one virtual object in the region determined as the field of view of the user 200 such that the user 200 wearing the electronic device 210 views the virtual object added to the real space. As an example, the user's field of view may include an angle and/or range in which the user may recognize an object without turning the head or moving the pupils while looking at the front. As an example, the region determined as the user's field of view may include the entire region or a partial region of the display device 215. As an example, the region determined as the user's field of view may be configured based on the size and shape of the display device 215, and/or disposition information (e.g., distance and/or direction) between the eyes of the user 200 wearing the electronic device 210 and the display device 215. As an example, the region determined as the user's field of view may correspond to the second sub-region (e.g., the second sub-region 234 in FIG. 2A) of the gesture recognition region (e.g., the gesture recognition region 230 in FIG. 2A) configured based on the camera module 213.

According to various embodiments, the memory 217 may store a variety of data used by at least one component (e.g., the processor 211, the camera module 213, and/or the display device 215) of the electronic device 210. For example, the data may include a list of gestures and/or group information of gestures in relation to the augmented reality service.

According to various embodiments, the electronic device 210 may output different visual effects, based on the type (e.g., the group) of the gesture detected in the first sub-region (e.g., the first sub-region 232 in FIG. 2A). According to an embodiment, the electronic device 210 may output a first visual effect corresponding to a first gesture included in the first group. The user wearing the electronic device 210 may recognize that a function related to the first gesture is to be executed more quickly, based on the first visual effect, without changing the detection location of the gesture. According to an embodiment, the electronic device 210 may output a second visual effect corresponding to the second gesture included in the second group. The user wearing the electronic device 210 may easily recognize a location for inputting a gesture, based on the second visual effect.

According to various embodiments, the electronic device 210 worn on the user may display virtual objects, based on the control of another electronic device 220.

Figure 3:
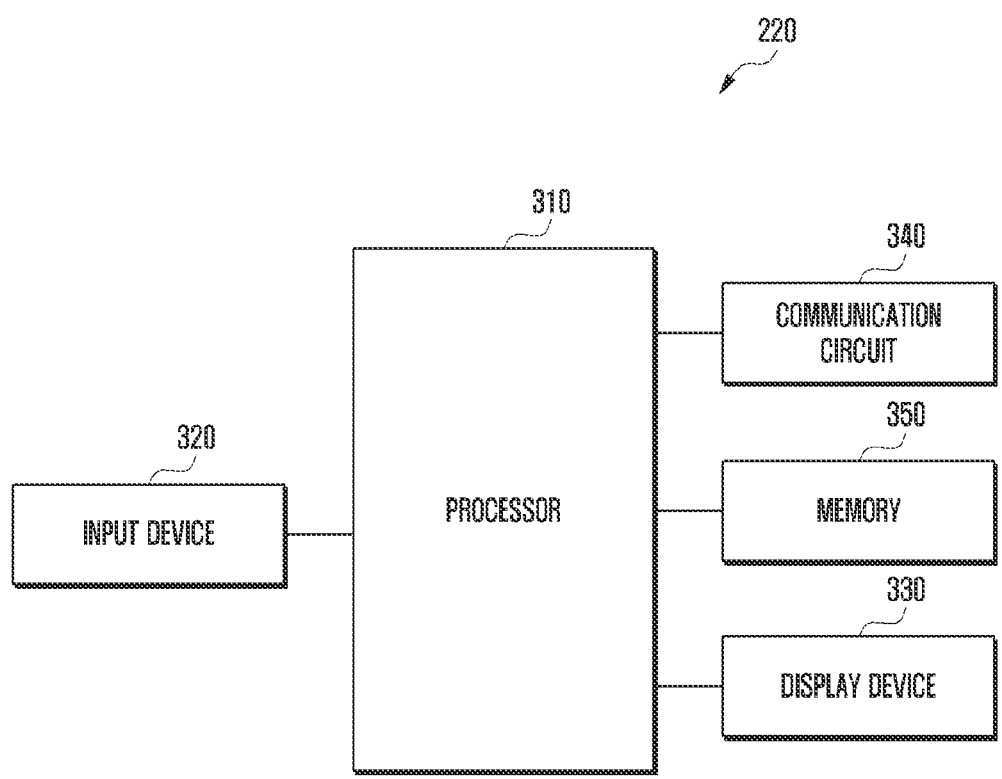
FIG. 3 is a block diagram of another electronic device for controlling the electronic device in FIG. 2 according to various example embodiments.

FIG. 3 is a block diagram of another electronic device for controlling the electronic device in FIG. 2 according to various embodiments. As an example, another electronic device 220 in FIG. 3 may be at least partially similar to the electronic device 101 in FIG. 1 or another electronic device 220 in FIG. 2A, or may include another embodiment of the electronic device.

Referring to FIG. 3, according to various embodiments, another electronic device 220 may include a processor 310, a communication circuit 320, an input device 330, a memory 340, and/or a display device 350. According to an embodiment, the processor 310 may be substantially the same as the processor 120 in FIG. 1 or may be included in the processor 120. The communication circuit 320 may be substantially the same as the communication module 190 in FIG. 1 or may be included in the communication module 190. The input device 330 may be substantially the same as the input device 150 in FIG. 1 or may be included in the input device 150. The memory 340 may be substantially the same as the memory 130 in FIG. 1 or may be included in the memory 130. The display device 350 may be substantially the same as the display device 160 in FIG. 1 or may be included in the display device 160. According to an embodiment, the processor 310 may control at least one of the communication circuit 320, the input device 330, the memory 340, and the display device 350, which are operatively connected directly or indirectly.

According to various embodiments, the processor 310, comprising processing circuitry, may control the electronic device 210 (e.g., an augmented reality device), which is connected to a communication link through the communication circuit 320, to provide an augmented reality service. According to an embodiment, the processor 310 may control the communication circuit 320 to transmit, to the electronic device 210, information related to at least one virtual object that is to be displayed to be added to a real space corresponding to a region determined as the field of view of a user 200 wearing the electronic device 210. For example, the electronic device 210 may output at least one virtual object to the region determined as the user's field of view, based on information related to at least one virtual object, which is provided from another electronic device 220. As an example, at least one virtual object may include at least one piece of information related to an external object located in the real space corresponding to the region determined as the field of view of the user 200 wearing the electronic device 210 in FIG. 2A and/or FIG. 2B or information related to an application executed in another electronic device 220. As an example, the external object may be detected based on image information provided from the electronic device 210 through the communication circuit 320.

According to various embodiments, the processor 310 may detect a gesture related to an augmented reality service. According to an embodiment, the processor 310 may obtain motion information of an external object (e.g., a user's hand), based on the image information related to the real space corresponding to the gesture recognition region, which is provided from the electronic device 210 through the communication circuit 320. If the motion information of the external object is included in a list of gestures related to augmented reality services, which is stored in the memory 340, the processor 310 may determine that a gesture related to the augmented reality service has been detected. As an example, the gesture recognition region is a region in which image information is able to be obtained through the camera module 213 in the electronic device 210, and may be configured based on the angle of view of the camera module 213.

According to various embodiments, the processor 310 may control the electronic device 210 to output a visual effect related to a gesture, based on a detection location of the gesture and/or the type (e.g., the group) of the gesture. According to an embodiment, if the gesture detected in the first sub-region of the gesture recognition region is a first gesture included in the first group, the processor 310 may control the electronic device 210 to output a first visual effect related to the gesture. For example, the processor 310 may control the communication circuit 320 to transmit information related to the first visual effect to the electronic device 210. For example, the electronic device 210 may output the first visual effect to at least a partial region relatively close to a recognition point of the gesture within a displayable region for the virtual object.

According to an embodiment, if the gesture detected in the first sub-region of the gesture recognition region is a second gesture included in the second group, the processor 310 may control the electronic device 210 to output guide information related to the gesture. For example, the processor 310 may control the communication circuit 320 to transmit information related to the guide information to the electronic device 210. For example, the electronic device 210 may output the guide information to at least a partial region relatively close to a recognition point of the gesture within the displayable region for the virtual object.

According to an embodiment, if a gesture is detected in the second sub-region (e.g., the second sub-region 234 in FIG. 2A) of the gesture recognition region, the processor 310 may control the electronic device 210 to output a second visual effect related to the gesture. For example, the processor 310 may control the communication circuit 320 to transmit information related to the second visual effect to the electronic device 210. For example, the electronic device 210 may output the second visual effect so as to at least partially overlap an external object related to the gesture within the displayable region for the virtual object.

According to various embodiments, the processor 310 may process at least one function related to a gesture. According to an embodiment, if a gesture is included in the first group and/or is detected in the second sub-region, the processor 310 may process a function related to the gesture. For example, the processor 310 may control the communication circuit 320 to transmit a processing result of a function related to the gesture to the electronic device 210.

For example, the electronic device 210 may output the processing result of a function related to the gesture, which is provided from another electronic device 220.

According to various embodiments, the communication circuit 320 may support performing communication using a wired and/or wireless communication channel between the electronic device 210 and another electronic device 220. As an example, the wireless communication channel may be established based on a short-range communication method such as Bluetooth, BLE (Bluetooth low energy), or wireless LAN.

According to various embodiments, the input device 330 may receive a command and/or data related to another electronic device 220 from the outside (e.g., a user). As an example, the input device 330 may include a microphone, a mouse, a keyboard, a digital pen (e.g., a stylus pen), or a touch circuit capable of detecting a touch input.

According to various embodiments, the memory 340 may store a variety of data used by at least one component (e.g., the processor 310, the communication circuit 320, the input device 330, and/or the display device 350) of another electronic device 220. For example, the data may include a list of gestures and/or group information of gestures related to the augmented reality service.

According to various embodiments, the display device 350, comprising a display, may display information processed by another electronic device 220. According to an embodiment, the display device 350 may display information related to an application executed in another electronic device 220. According to an embodiment, the display device 350 may display information related to an augmented reality service provided through the electronic device 210.

According to various embodiments, an electronic device (e.g., the electronic device 101 in FIG. 1 or the electronic device 210 in FIG. 2A or 2B) may include a memory (e.g., the memory 130 in FIG. 1 or the memory 217 in FIG. 2B) configured to store first gesture information and second gesture information, a camera module (e.g., the camera module 180 in FIG. 1 or the camera module 213 in FIG. 2B), a display device (e.g., the display device 160 in FIG. 1 or the display device 215 in FIG. 2B), and a processor (e.g., the processor 120 in FIG. 1 or the processor 211 in FIG. 2B) operatively connected, directly or indirectly, to the memory, the display device, and the camera module, wherein the processor, comprising processing circuitry, may be configured to detect a gesture, based on image information obtained through the camera module, identify the gesture, based on the case where a detection location of the gesture is included in a first region different from a second region corresponding to a field of view of a user wearing the electronic device, among the image information obtained through the camera module, if the identified gesture corresponds to the first gesture information, control the display device to output a first visual effect related to the gesture, and if the identified gesture corresponds to the second gesture information, control the display device to output guide information related to the gesture.

According to various embodiments, the image information obtained through the camera module may be divided into the second region corresponding to the field of view of the user wearing the electronic device and the first region that is the remaining regions, excluding the second region.

According to various embodiments, the first visual effect may be displayed on at least a portion adjacent to the detection location of the gesture within a region corresponding to the user's field of view in a display region of the display device.

According to various embodiments, the second region may include at least a portion configured based on a region corresponding to the user's field of view of the display device, among the image information obtained through the camera module.

According to various embodiments, the guide information may include information related to a change in the location of an external object related to the gesture.

According to various embodiments, the processor may be configured to control, if the gesture corresponds to the first gesture information of a first group, the display device to output the first visual effect and control, if the gesture corresponds to the second gesture information of a second group, the display device to output the guide information.

According to various embodiments, the first gesture information of the first group may include at least one gesture to which a function executable in the first region and the second region is mapped, and the second gesture information of the second group may include at least one gesture related to control of a virtual object.

According to various embodiments, the processor may be configured to control the display device to output a second visual effect related to the gesture, based on the case where the detection location of the gesture is included in the second region.

According to various embodiments, the second visual effect may be displayed on at least a portion of a display region of the display device configured based on a location of an external object related to the gesture.

According to various embodiments, the processor may be configured, if the gesture corresponding to the second gesture information is related to motions of a plurality of external objects, to identify detection locations of the plurality of external objects and to control the display device to output a second visual effect related to the gesture, based on the case where the detection locations of the plurality of external objects are included in the second region.

According to various embodiments, the processor may be configured to control the display device to output guide information related to the gesture, based on the case where a detection location of at least one external object among the plurality of external objects is included in the first region.

According to various embodiments, the processor may be configured to execute an application program related to the gesture if the gesture corresponds to the first gesture information.

Figure 4:
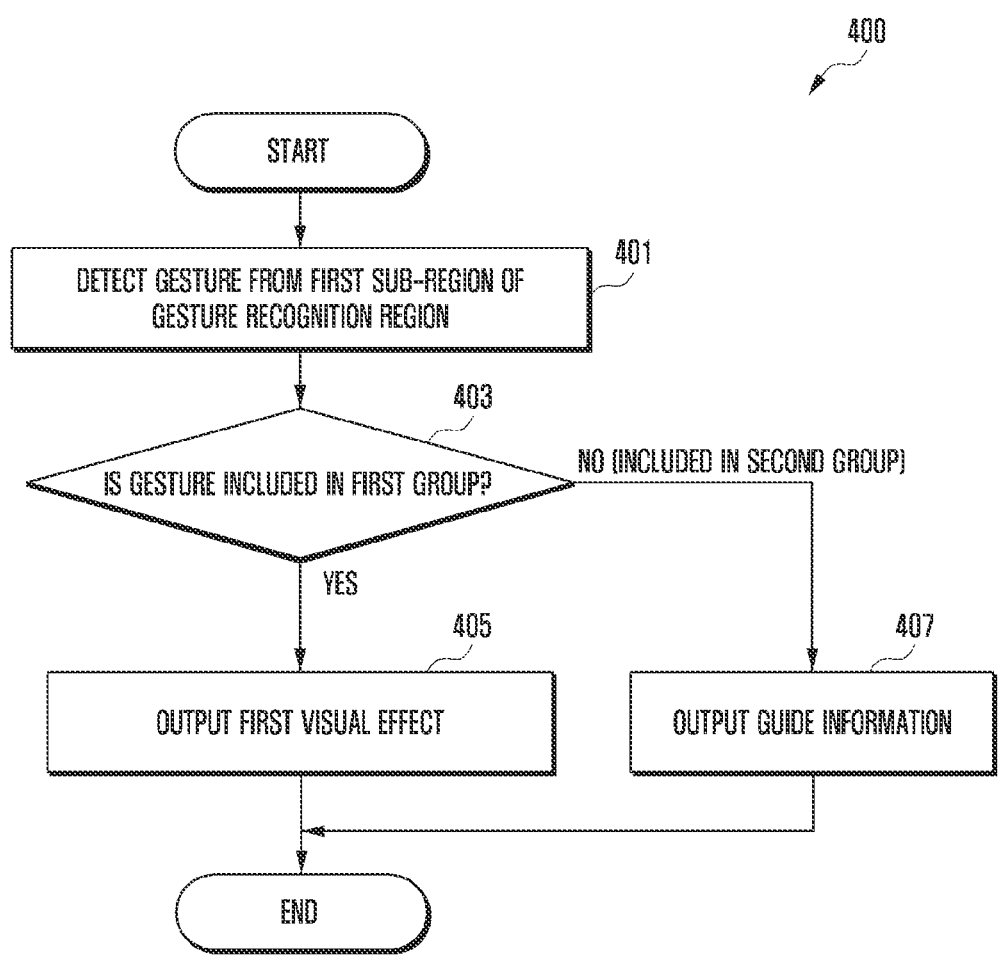
FIG. 4 is a flowchart illustrating selective output of guide information, based on a group of gestures in an electronic device according to various example embodiments.

FIG. 4 is a flowchart 400 illustrating selective output of guide information, based on a group of gestures in an electronic device according to various embodiments. Operations in the following embodiment may be sequentially performed, but are not necessarily sequentially performed. For example, the sequence of the operations may vary, and at least two operations may be performed in parallel. As an example, the electronic device in FIG. 4 may be the electronic device 101 in FIG. 1 or the electronic device 210 in FIG. 2A or 2B. As an example, at least some configurations in FIG. 4 will be described with reference to FIGS. 5A to 5I. FIGS. 5A, 5B, 5C, 5D, 5E, 5F, 5G, 5H, and 5I illustrate an example of a screen configuration for providing a visual effect related to a gesture according to various embodiments.

Referring to FIG. 4, according to various embodiments, an electronic device (e.g., the processor 120 in FIG. 1, the camera module 180 in FIG. 1, the processor 211 in FIG. 2, or the camera module 213 in FIG. 2) may obtain a gesture from a first sub-region of a gesture recognition region in operation 401. According to an embodiment, referring to FIG. 5A, if the electronic device 210 is worn on a user 200, the processor 211 may display a virtual object 520 in a region (e.g., a second sub-region 514) determined as a field of view of the user 200 through the display device 215. According to an embodiment, the processor 211 may recognize a gesture by an external object (e.g., a user's hand) within the gesture recognition region 510 while providing an augmented reality service. For example, the gesture recognition region 510 is a region in which image information is able to be obtained through the camera module 213 and may be divided into a first sub-region 512 and a second sub-region 514, based on the region determined as the field of view of the user 200 (e.g., a displayable region for virtual objects). For example, the processor 211 may detect a gesture in the first sub-region 512 of the gesture recognition region 510. As an example, the gesture may include motion information of an external object included in a gesture list related to the augmented reality service stored in the memory 217, among motion information of an external object (e.g., a user's hand) obtained from the gesture recognition region 510 through the camera module 213. As an example, the second sub-region 514 may include a partial region corresponding to the region determined as the field of view of the user 200 (e.g., a displayable region for virtual objects) in the gesture recognition region 510. As an example, the first sub-region 512 may include the remaining regions, excluding the second sub-region 514 from the gesture recognition region 510. As an example, a gesture detected in the first sub-region 512 may include a gesture related to an external object whose motion is detected in the first sub-region 512. As an example, the region determined as the field of view of the user 200 is a region that is determined to be recognizable by the user 200 wearing the electronic device 210 through the display device 215, and may include all or at least a portion of the display device 215.

According to various embodiments, the electronic device (e.g., the processor 120 or 210), in operation 403, may identify whether or not a gesture obtained from the first sub-region of the gesture recognition region is included in a first group among a plurality of specified groups. For example, a plurality of specified groups may be classified based on the correlation between gestures and virtual objects. As an example, a first group among the plurality of groups may include at least one first gesture to which a function (e.g., going to home, executing an application, or changing a mode), which is not related to control of a virtual object, is mapped. As an example, a second group among the plurality of groups may include at least one second gesture to which a function (e.g., selecting, moving, enlarging, reducing, or changing an angle), which is related to control and/or display of a virtual object, is mapped.

According to various embodiments, if the gesture obtained in the first sub-region of the gesture recognition region is the first gesture included in the first group (e.g., "YES" in operation 403), the electronic device (e.g., the processor 120 and/or 210 and/or the display device 215) may output a first visual effect related to the gesture in operation 405. According to an embodiment, referring to FIG. 5A, if a first gesture 530 included in the first group is detected in the first sub-region 512, the processor 211 may control the display device 215 to output a first visual effect 532 related to the first gesture 530 to a region (e.g., the second sub-region 514) capable of displaying a virtual object. For example, the display device 215 may output the first visual effect 532 such that the first visual effect 532 is viewed to be superimposed on the real space that the user 200 wearing the electronic device 210 is viewing through the display device 215. As an example, the first visual effect 532 may be output (or displayed) onto at least a partial region relatively close to the recognition point of the first gesture 530 within the region determined as the field of view of the user 200 (e.g., the second sub-region 514). As an example, the first visual effect 532 may include a virtual object related to gesture recognition in the first sub-region 512 or a virtual object related to execution of a function mapped to a gesture. As an example, the first gesture 530 may include a gesture to which a function not related to control of a virtual object, such as going to home, executing an application, or changing a mode, is mapped.

According to various embodiments, if a gesture in the first sub-region of the gesture recognition region is not include in the first group (e.g., "NO" in operation 403), the electronic device (e.g., the processor 120 or 210 or the display device 215) may output guide information related to the gesture in operation 407. According to an embodiment, referring to FIG. 5C, if a second gesture 540 included in a second group different from the first group is detected in the first sub-region 512, the processor 211 may control the display device 215 to output guide information 542 related to the second gesture 540 in the region determined as the field of view of the user 200 (e.g., the second sub-region 514). For example, the display device 215 may output the guide information 542 such that the guide information 542 is viewed to be superimposed on at least a partial region of the real space that the user 200 wearing the electronic device 210 is viewing through the display device 215. As an example, the guide information 542 may be output (or displayed) onto at least a partial region relatively close to the recognition point of the second gesture 540 within the region determined as the field of view of the user 200 (e.g., the second sub-region 514). As an example, the guide information 542 may include a virtual object related to a locational movement of an external object related to the gesture. As an example, the second gesture 540 may include a gesture to which a function related to control of the virtual object, such as selecting, moving, enlarging, reducing, or changing an angle of the virtual object, is mapped.

Figure 5A:
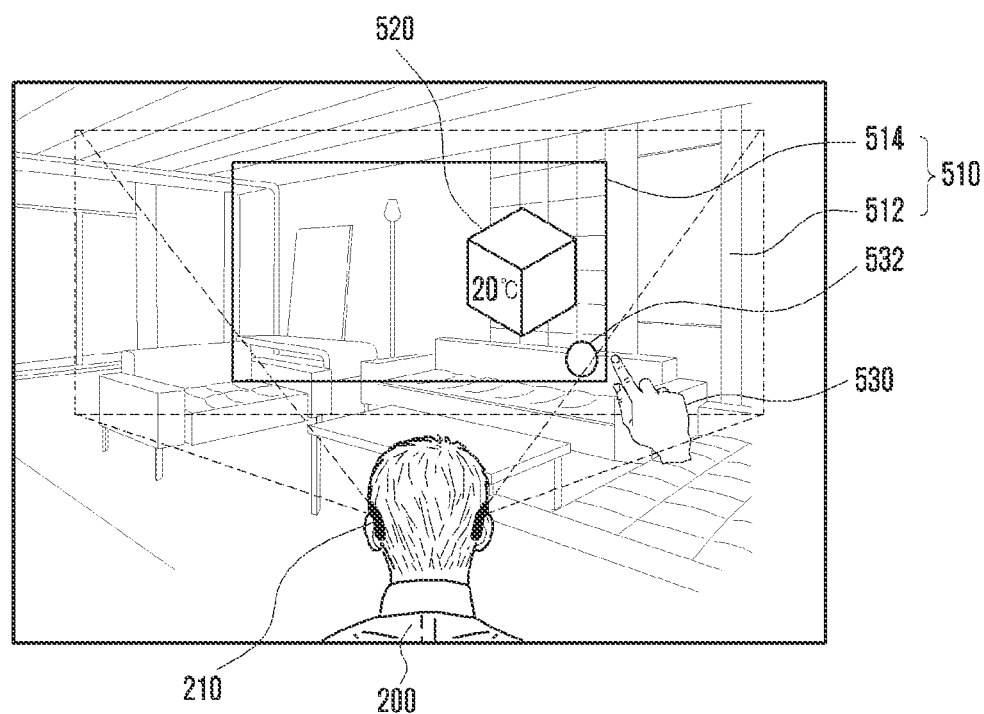
FIGS. 5A, 5B, 5C, 5D, 5E, 5F, 5G, 5H, and 5I illustrate an example of a screen configuration for providing a visual effect related to a gesture according to various example embodiments.
Figure 5B:
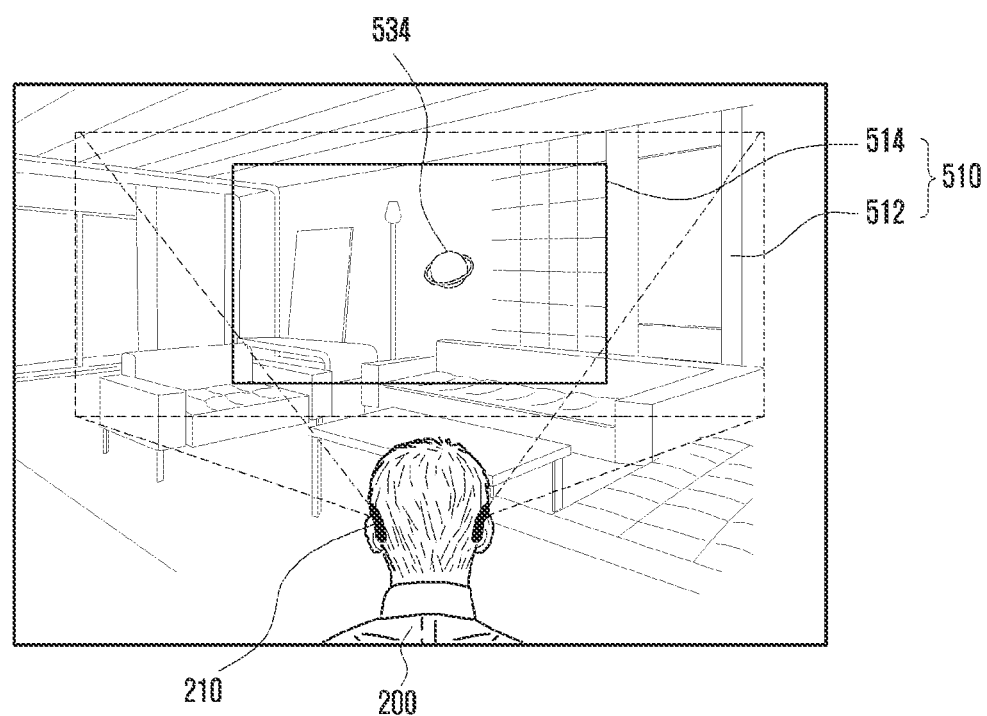

According to various embodiments, the electronic device 210 may execute a function mapped to a first gesture included in the first group. According to an embodiment, referring to FIG. 5A, if a first type of first gesture 530 included in the first group is detected in the first sub-region 512, the processor 211 may execute an application mapped to the first gesture 530, based on a function of "execution of application" mapped to the first type of first gesture 530. The processor 211 may control the display device 215 to display at least one virtual object 534 related to the execution of the application related to the first gesture 530 as shown in FIG. 5B.

Figure 5C:
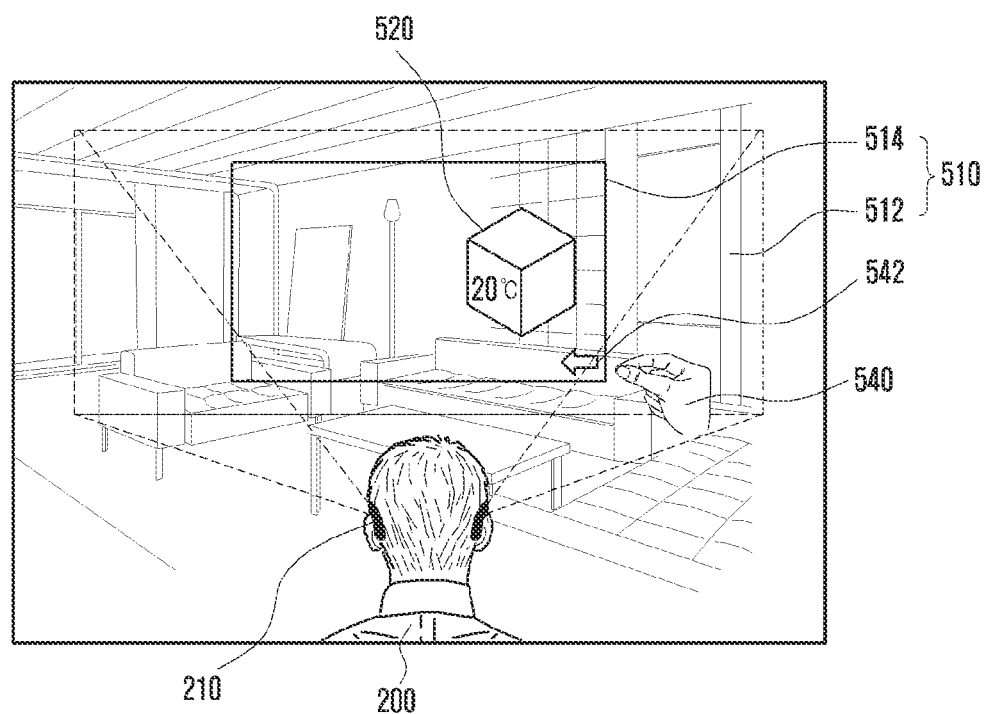
Figure 5D:
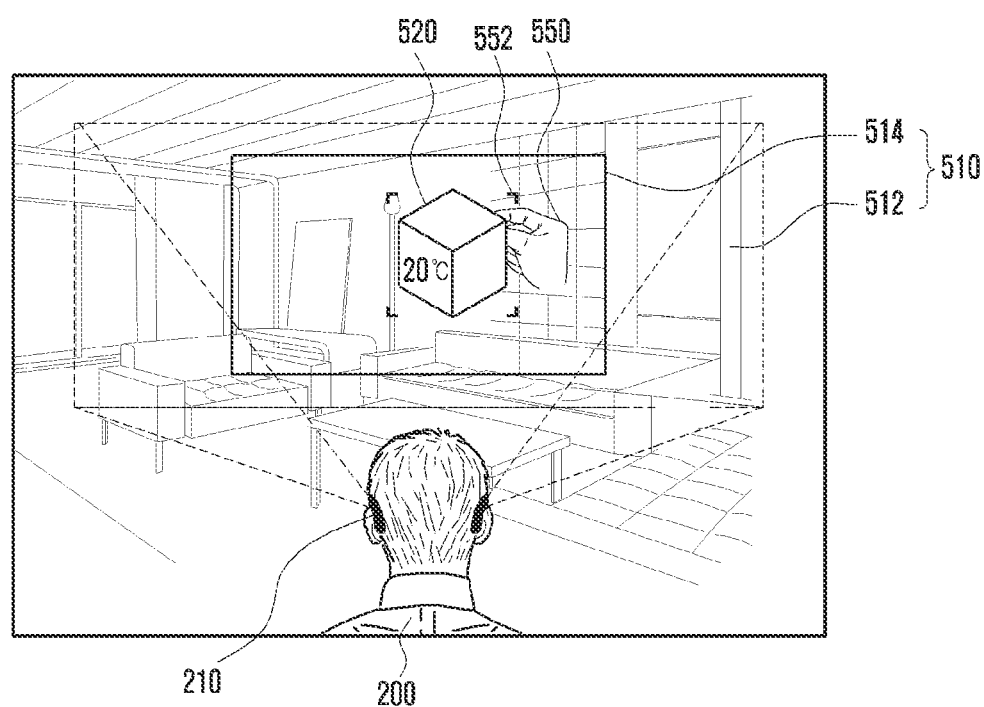
Figure 5E:
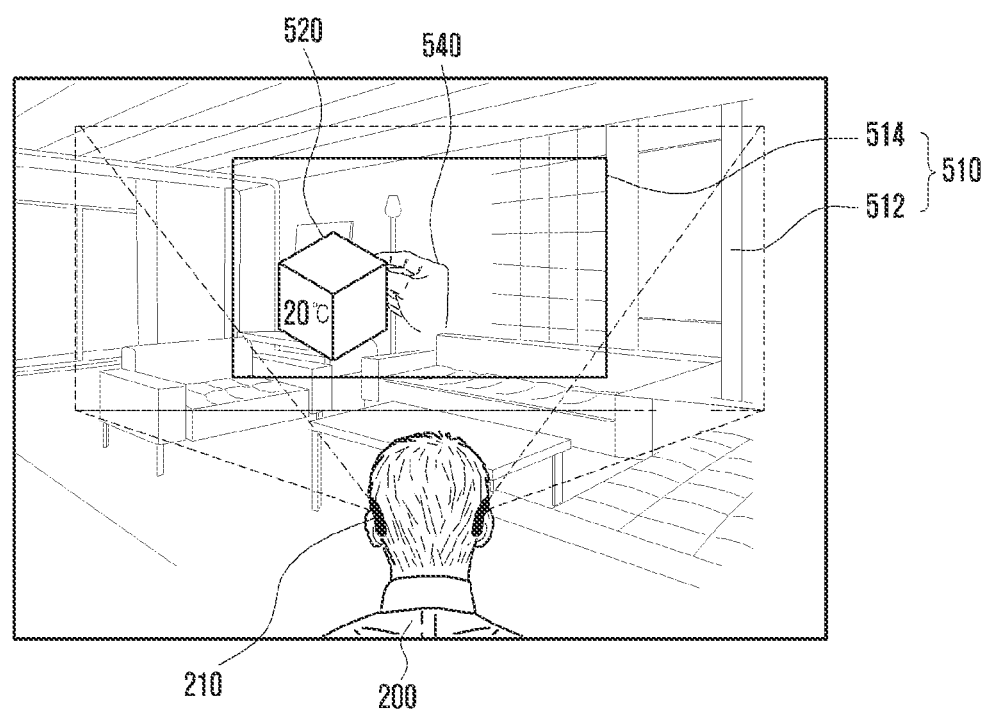
Figure 5F:
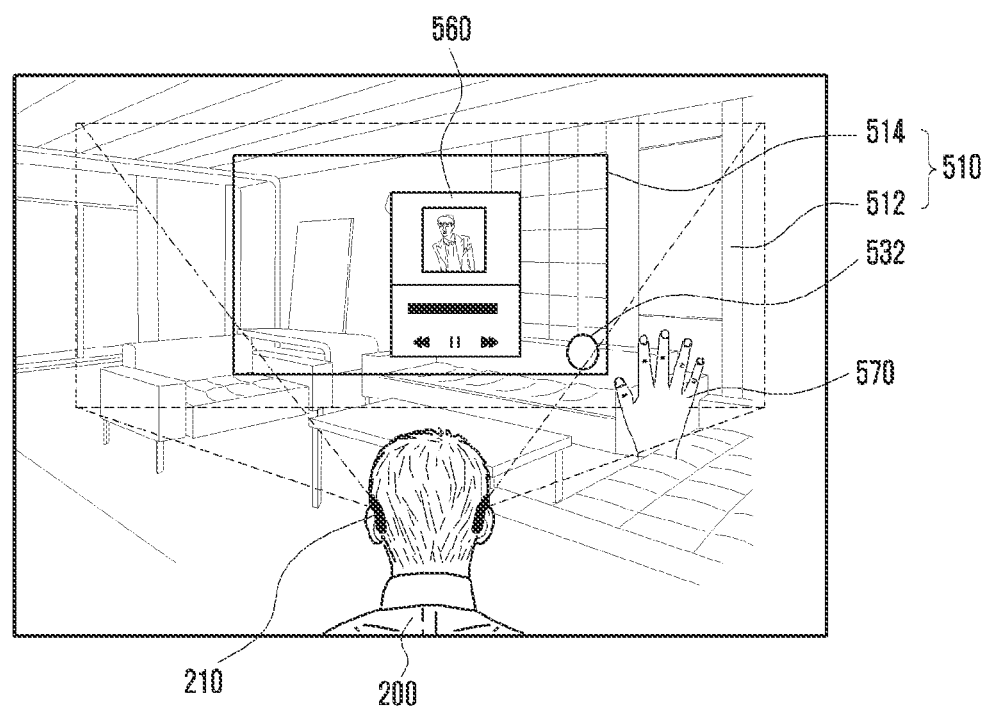
Figure 5G:
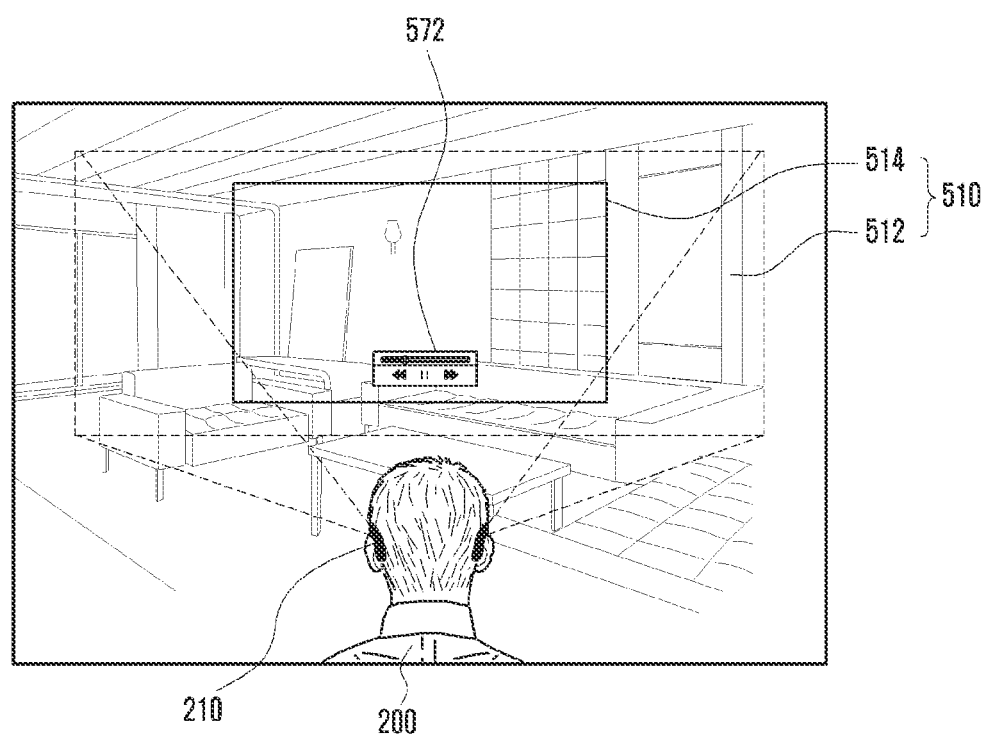

According to an embodiment, referring to FIG. 5F, the processor 211 may control the display device 215 to output a virtual object 560 related to the application (e.g., a music reproduction application) executed in the electronic device 210 such that the virtual object 560 is viewed to be added to the real space corresponding to the field of view of the user 200 wearing the electronic device 210. As an example, the virtual object 560 related to an application (e.g., a music reproduction application) may include an execution screen of the application. For example, if a second type of first gesture 570 included in the first group is detected in the first sub-region 512, the processor 211 may change an operation mode of an application (e.g., a music reproduction application) executed in the electronic device 210, based on a "mode change" function mapped to the second type of first gesture 570. As an example, the processor 211, as shown in FIG. 5G, may control the display device 215 to output a virtual object 572 corresponding to a simplified execution screen of an application, based on a change in the operation mode of an application (e.g., a music reproduction application) executed in the electronic device 210.

Figure 5H:
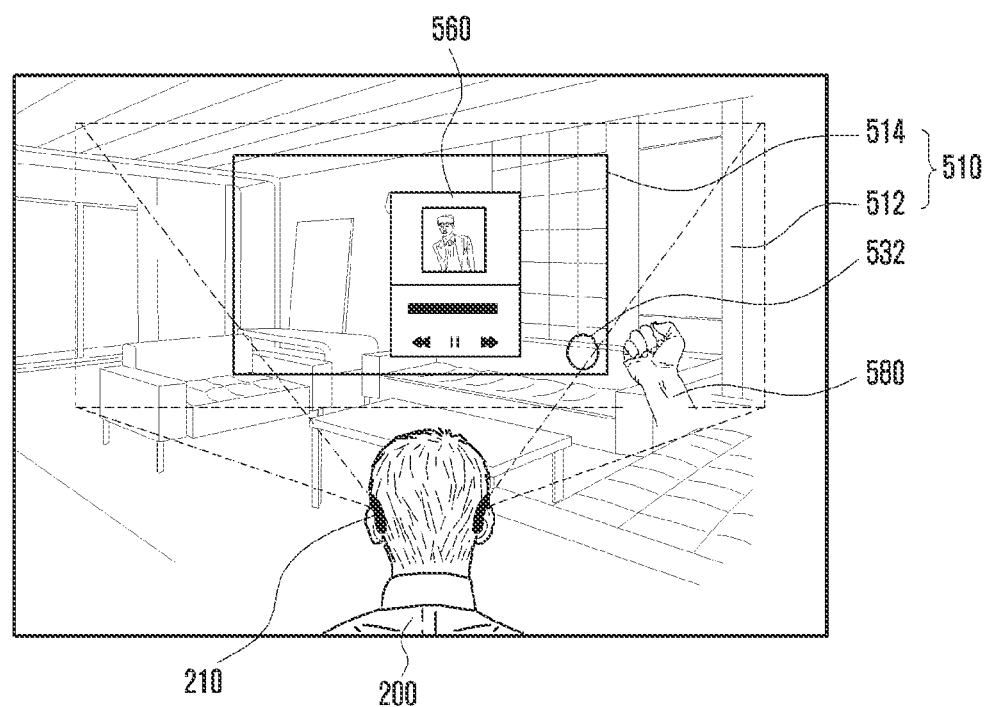
Figure 5I:
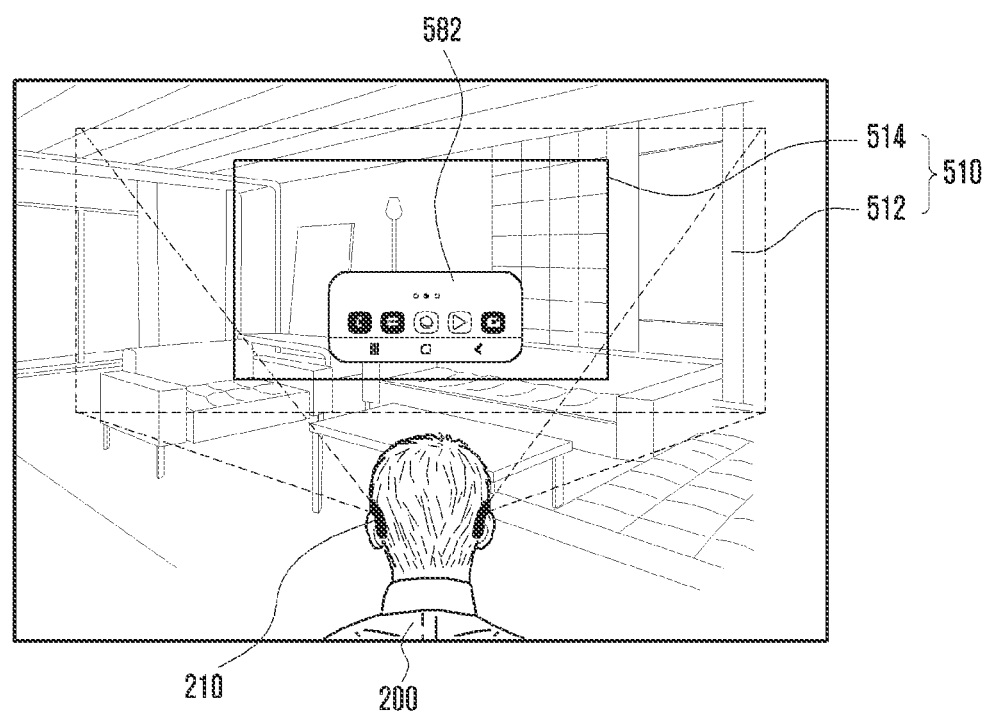

According to an embodiment, as shown in FIG. 5H, if a third type of first gesture 580 included in the first group is detected in the first sub-region 512, the processor 211 may control the display device 215 to display a home screen, based on a function of "going to home" mapped to the third type of first gesture 580. As an example, the processor 211 may control the display device 215 to output a virtual object 582 corresponding to the home screen of the electronic device 210 as shown in FIG. 5I. As an example, the virtual object 582 corresponding to the home screen may include at least one icon related to at least one application executable in the electronic device 210.

Figure 6:
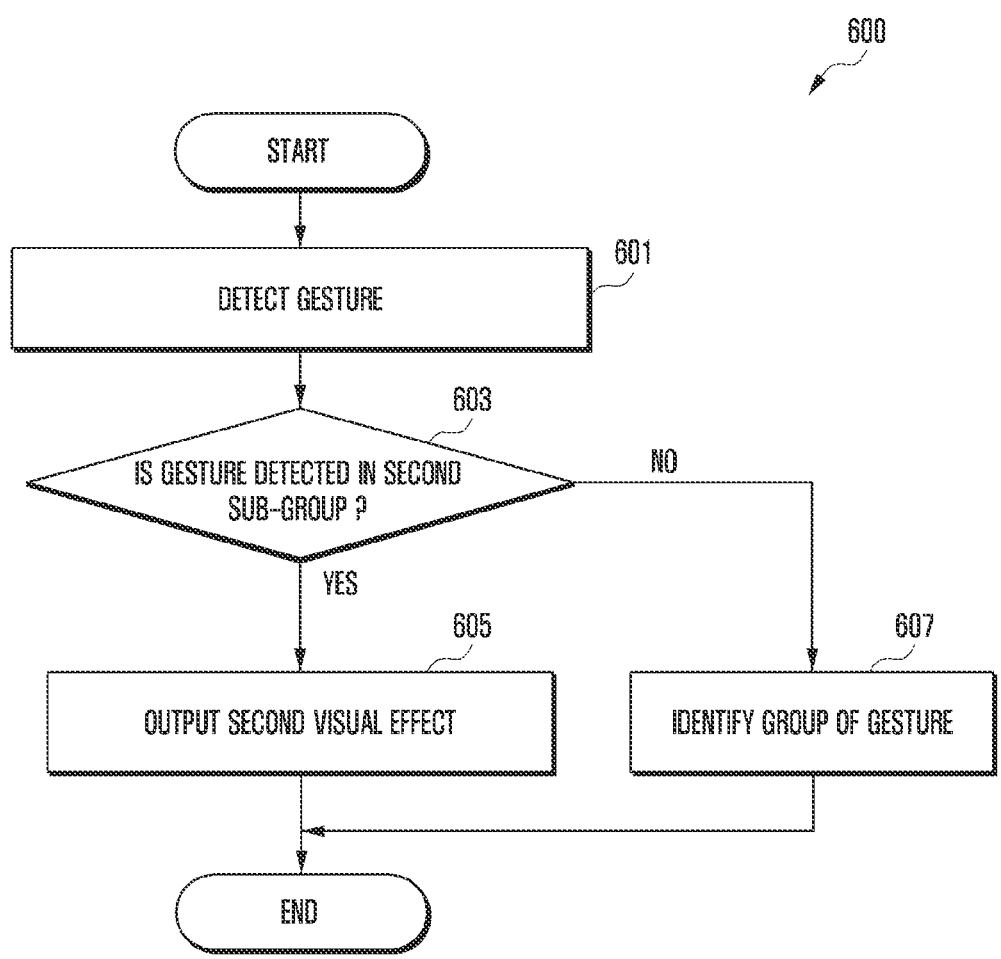
FIG. 6 is a flowchart illustrating output of a visual effect related to a gesture, based on a location of the gesture in an electronic device, according to various example embodiments.

FIG. 6 is a flowchart 600 illustrating output of a visual effect related to a gesture, based on a location of the gesture in an electronic device, according to various embodiments. According to an embodiment, operations in FIG. 6 may be detailed operations of operation 401 in FIG. 4. Operations in the following embodiment may be sequentially performed, but are not necessarily sequentially performed. For example, the sequence of the operations may vary, and at least two operations may be performed in parallel. As an example, the electronic device in FIG. 6 may be the electronic device 101 in FIG. 1 or the electronic device 210 in FIG. 2A or 2B.

Referring to FIG. 6, according to various embodiments, an electronic device (e.g., the processor 120 in FIG. 1, the camera module 180 in FIG. 1, the processor 211 in FIG. 2, or the camera module 213 in FIG. 2) may detect a gesture while providing an augmented reality service in operation 601. According to an embodiment, referring to FIG. 5D, the processor 211 may output, through the display device 215, a virtual object 520 (e.g., temperature information) to be viewed so as to be added to at least a partial region of the real space corresponding to the field of view of the user 200 wearing the electronic device 210. For example, the processor 211 may obtain motion information of an external object (e.g., a user's hand), based on image information obtained through the camera module 213 while providing the augmented reality service. If the motion information of the external object is included in a gesture list related to an augmented reality service stored in the memory 217, the processor 211 may determine that a gesture corresponding to the motion of the external object has been detected.

According to various embodiments, the electronic device (e.g., the processor 120 and/or 210) may identify whether or not a gesture is detected in the second sub-region of the gesture recognition region in operation 603. According to an embodiment, referring to FIG. 5D, the processor 211 may identify whether or not the location of an external object (e.g., a user's hand) related to the gesture 540 is included in the second sub-region 514 of the gesture recognition region 510.

According to various embodiments, if a gesture is detected in the second sub-region of the gesture recognition region (e.g., "YES" in operation 603), the electronic device (e.g., the processor 120 or 210 or the display device 215) may output a second visual effect related to the gesture in operation 605. According to an embodiment, referring to FIG. 5D, if a second gesture 540 is detected in the second sub-region 514, the processor 211 may control the display device 215 to output a second visual effect 552 related to the second gesture 540 to the region determined as the field of view of the user 200 (e.g., the second sub-region 514). For example, if a fourth type of second gesture 540 related to "movement of a virtual object" is detected in the second sub-region 514, the display device 215, as shown in FIG. 5D, may output a second visual effect 552, based on the display location of the virtual object 520, so that the user 200 may recognize the virtual object 520 selected by the second gesture 540. For example, the display device 215 may output the second visual effect 552 such that the second visual effect 552 is viewed to be superimposed on at least a portion of the external object corresponding to the second gesture 540. As an example, the second visual effect 552 may include a virtual object related to recognition of a gesture in the second sub-region 514 or a virtual object related to execution of a function mapped to the gesture. As an example, if a gesture is detected in the second sub-region of the gesture recognition region, the processor 211 may control the display device 215 to output a second visual effect related to the gesture, regardless of the type (or group) of the gesture.

According to various embodiments, if a gesture is detected in the first sub-region, instead of the second sub-region, of the gesture recognition region (e.g., "NO" in operation 603), the electronic device (e.g., the processor 120 or 210 or the display device 215) may identify a group including the gesture from among a plurality of specified groups in operation 607. According to an embodiment, as shown in FIG. 5A or 5C, if a gesture is detected in the first sub-region 512, the processor 211 may identify a group (e.g., the first group or the second group) including the gesture. For example, as shown in FIG. 5A, if a first gesture 530 included in the first group is detected, the processor 211 may control the display device 215 to output a first visual effect 532 in the region determined as the field of view of the user 200 (e.g., the second sub-region 514). For example, as shown in FIG. 5C, if a second gesture 540 included in the second group is detected, the processor 211 may control the display device 215 to output guide information 542 in the region determined as the field of view of the user 200 (e.g., the second sub-region 514).

According to various embodiments, after outputting the second visual effect, the electronic device 210 may execute a function mapped to the gesture detected in the second sub-region. According to an embodiment, if a fourth type of second gesture 540 related to "movement of a virtual object" is detected in the second sub-region 514, the processor 211, as shown in FIG. 5E, may change the location of the virtual object 520, based on the motion of the second gesture 540. The processor 211 may determine the location at which the selection of the virtual object 520 by the second gesture 540 is released to be the finally changed location of the virtual object 520.

FIG. 7 is a flowchart 700 illustrating selective output of guide information, based on the group and location of a gesture in an electronic device, according to various embodiments. Operations in the following embodiment may be sequentially performed, but are not necessarily sequentially performed. For example, the sequence of the operations may vary, and at least two operations may be performed in parallel. As an example, the electronic device in FIG. 7 may be the electronic device 101 in FIG. 1 or the electronic device 210 in FIG. 2A or 2B. As an example, at least some configurations in FIG. 7 will be described with reference to FIGS. 8A to 8F. FIGS. 8A, 8B, 8C, 8D, 8E, and 8F illustrate another example of a screen configuration for providing a visual effect related to a gesture according to various embodiments.

Referring to FIG. 7, according to various embodiments, an electronic device (e.g., the processor 120 in FIG. 1, the camera module 180 in FIG. 1, the processor 211 in FIG. 2, or the camera module 213 in FIG. 2) may obtain a gesture related to the motion of a plurality of external objects while providing an augmented reality service in operation 701. According to an embodiment, the processor 211, referring to FIG. 8A, based on image information obtained through the camera module 213, may obtain motion information of a first external object (e.g., a user's right hand) 810 and a second external object (e.g., a user's left hand) 812. If the motion information of the first external object 810 and the second external object 812 is included in a gesture list related to the augmented reality service stored in the memory 217, the processor 211 may determine that a fifth type of gesture corresponding to the motion of the plurality of external objects 810 and 812 has been detected. As an example, the first external object 810 and the second external object 812 may be detected in a gesture recognition region 800. As an example, the gesture recognition region 800 is a region in which image information is able to be obtained through the camera module 213 and may be divided into a first sub-region 802 and a second sub-region 804, based on a region determined as the field of view of the user 200 (e.g., a displayable region for virtual objects). As an example, the second sub-region 804 may include a partial region corresponding to the region determined as the field of view of the user 200 (e.g., a displayable region for virtual objects) in the gesture recognition region 800. As an example, the first sub-region 802 may include the remaining regions, excluding the second sub-region 804 from the gesture recognition region 800. As an example, gestures related to the motion of the plurality of external objects may include a two-handed gesture.

Figure 8A:
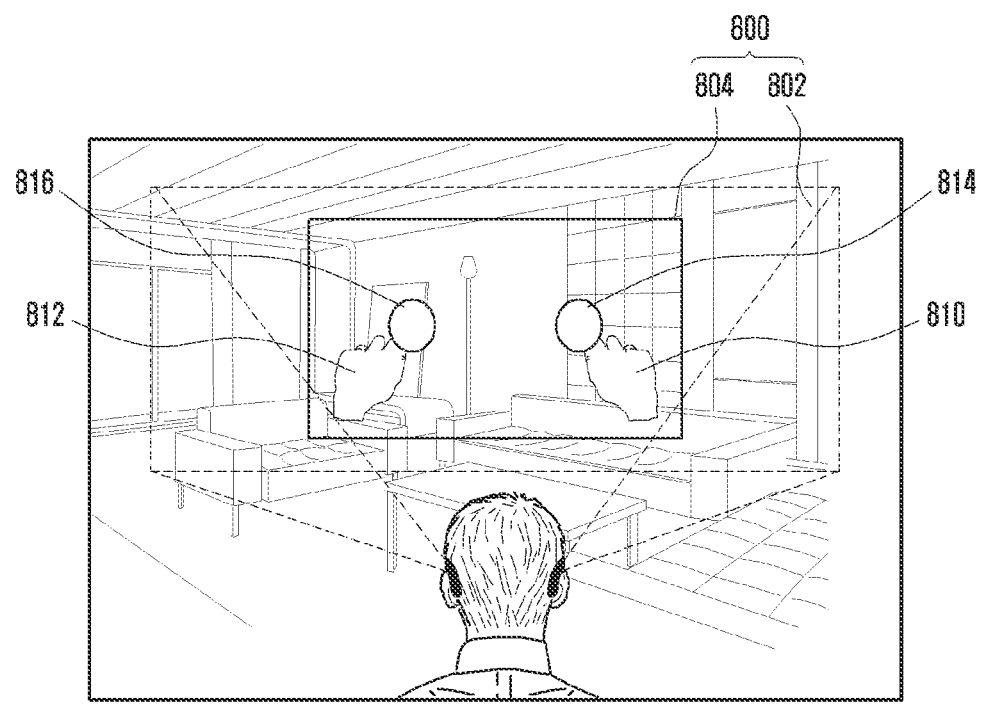
FIGS. 8A, 8B, 8C, 8D, 8E, and 8F illustrate another example of a screen configuration for providing a visual effect related to a gesture according to various example embodiments.

According to various embodiments, in operation 703, the electronic device (e.g., the processor 120 or 210) may identify whether or not a gesture related to the motion of the plurality of external objects is included in a first group among a plurality of specified groups. According to an embodiment, the plurality of specified groups may be classified based on the correlation between gestures and virtual objects. For example, if the fifth type of gesture in FIG. 8A is not related to control of a virtual object, it may be determined to be a first gesture included in the first group among the plurality of groups.

According to various embodiments, if a gesture related to the motion of the plurality of external objects is included in the first group (e.g., "YES" in operation 703), the electronic device (e.g., the processor 120 or 210 or the display device 215) may output a first visual effect related to the gesture in operation 705. According to an embodiment, if the gesture obtained in operation 701 is a first gesture included in the first group, the processor 211 may output a first visual effect related to the gesture. For example, referring to FIG. 8A, if the fifth type of gesture related to the motion of the first external object 810 and the second external object 812, which is obtained in the second sub-region 804, is included in the first group, the processor 211 may control the display device 215 to output first visual effects 814 and 816 related to the fifth type of gesture obtained in the second sub-region 804. For example, the display device 215 may output the first visual effects 814 and 816 to be viewed so as to be superimposed on at least a portion of the first external object 810 and the second external object 812 in the real space that the user wearing the electronic device 210 is viewing through the display device 215. As an example, the first visual effects 814 and 816 may include a virtual object related to a recognition location of the gesture or a virtual object related to execution of a function mapped to the gesture.

Figure 8B:
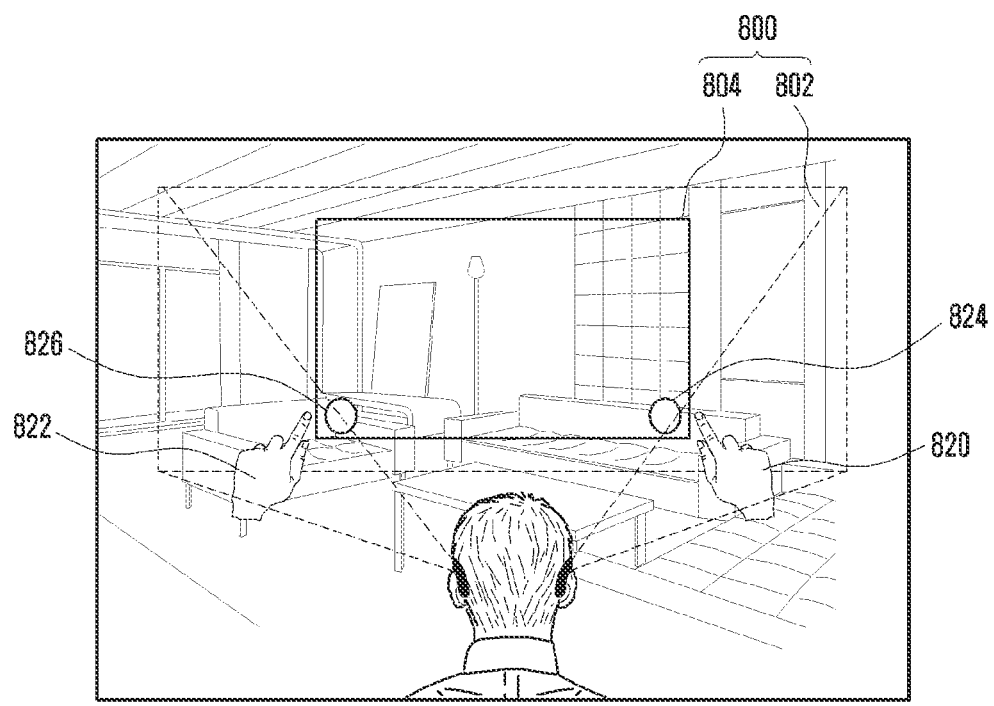

For example, referring to FIG. 8B, if a fifth type of gesture related to the motion of a third external object 820 and a fourth external object 822 detected in the first sub-region 802 is included in the first group, the processor 211 may control the display device 215 to output first visual effects 824 and 826 related to the fifth type of gesture obtained in the first sub-region 802. For example, the display device 215 may output the visual effects 824 and 826 related to the third external object 820 and the fourth external object 822 to at least a partial region relatively close to the detection points of the third external object 820 and the fourth external object 822 within a region determined as the field of view of the user 200 (e.g., a second sub-region 804). As an example, the first visual effects 824 and 826 in FIG. 8B may be output to in different sizes from the first visual effects 814 and 816 related to the fifth type of gesture obtained in the second sub-region 804 in FIG. 8A in order to indicate the recognition location of the gesture.

Figure 8C:
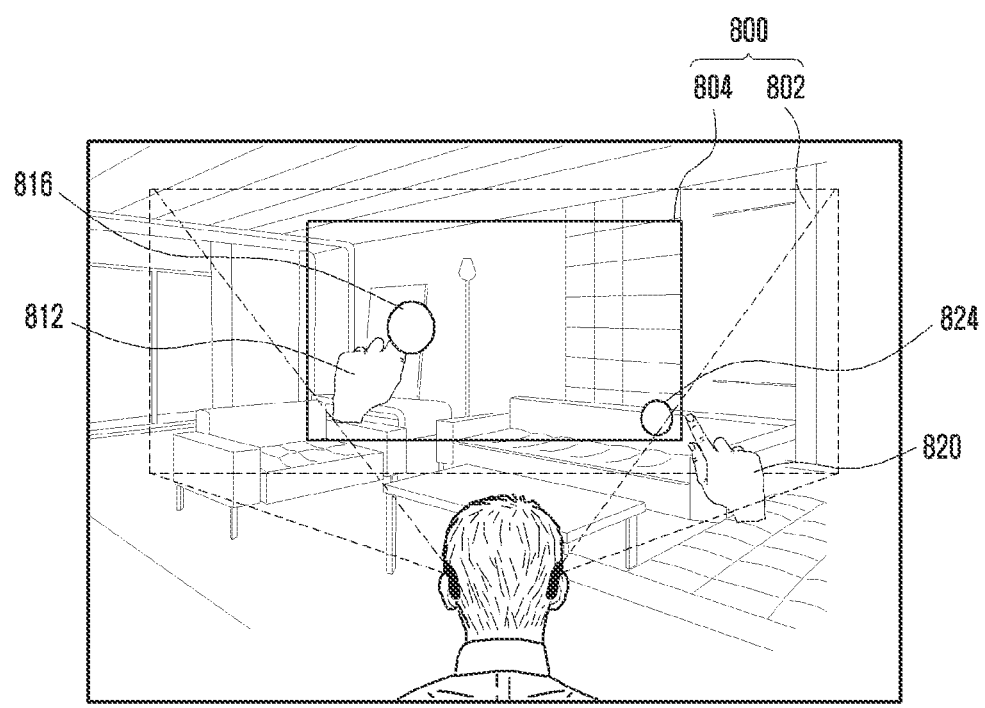
Figure 8D:
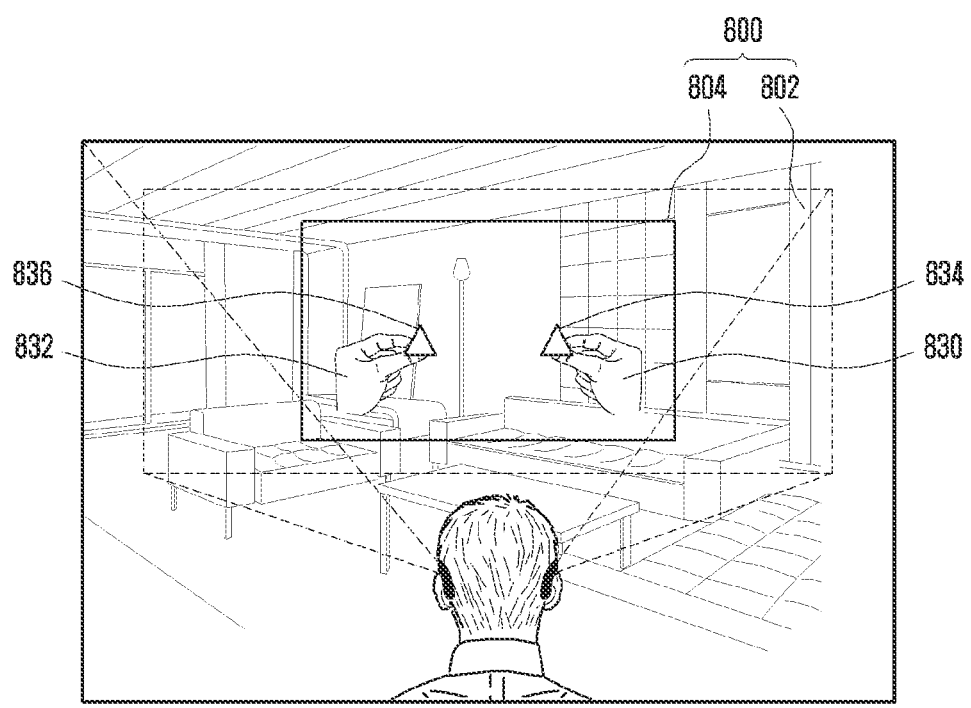
Figure 8E:
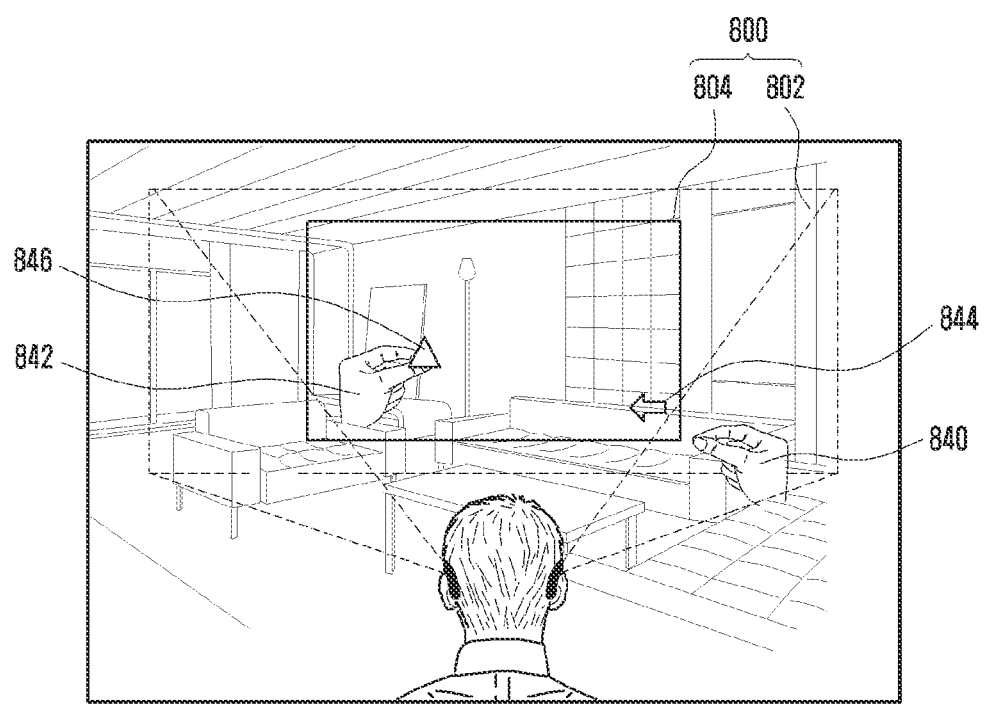
Figure 8F:
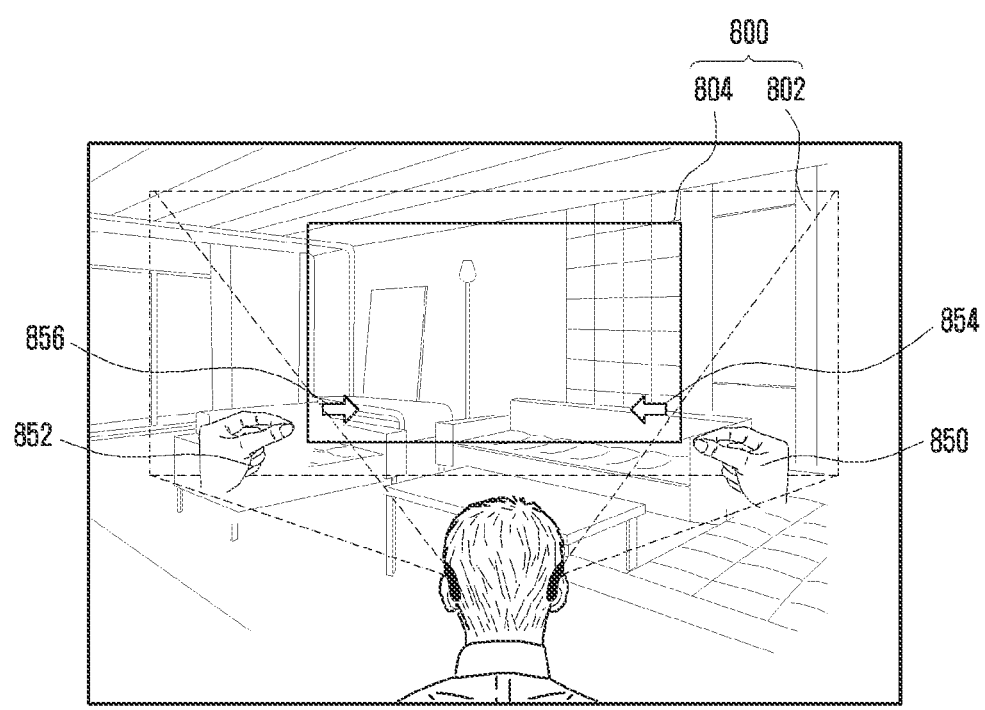

For example, referring to FIG. 8C, if a fifth type of gesture related to the motion of the third external object 820 detected in the first sub-region 802 and the second external object 812 detected in the second sub-region 804 is included in the first group, the processor 211 may control the display device 215 to output first visual effects 824 and 816 related to the fifth type of gesture. For example, the display device 215 may output the visual effect 824 related to the third external object 820 to at least a partial region relatively close to the detection point of the third external object 820 within the region determined as the field of view of the user 200 (e.g., the second sub-region 804). For example, the display device 215 may output the visual effect 816 to be viewed so as to be superimposed on at least a portion of the second external object 812 in the real space that the user 200 wearing the electronic device 210 is viewing through the display device 215. For example, the visual effect 824 related to the third external object 820 and the visual effect 816 related to the second external object 812 may include the same type of virtual object or different types of virtual objects. As an example, the visual effect 824 related to the third external object 820 may include a first type of (e.g., a first-sized) virtual object representing recognition information in the first sub-region 802, and the visual effect 816 related to the second external object 812 may include a second type of (e.g., a second-size) virtual object representing recognition information in the second sub-region 804. As an example, the visual effect 824 related to the third external object 820 and the visual effect 816 related to the second external object 812 may include the same type of virtual object, based on the function related to the fifth type of gesture. As an example, the visual effect 824 related to the third external object 820 and the visual effect 816 related to the second external object 812 may include the same type of virtual object indicating that the fifth type of gesture is included in the first group.

According to various embodiments, if a gesture related to the motion of the plurality of external objects is included in a second group different from the first group (e.g., "NO" in operation 703), the electronic device (e.g., the processor 120 or 210 or the display device 215) may identify whether or not the plurality of external objects related to the gesture is detected in the second sub-region of the gesture recognition region in operation 707. According to an exemplary embodiment, referring to FIG. 8D, if a fifth external object 830 and a sixth external object 832 related to a sixth type of gesture is included in the second sub-region 804 of the gesture recognition region 800, the processor 211 may determine that the plurality of external objects 830 and 832 related to the sixth type of gesture is included in the second sub-region 804. According to an embodiment, referring to FIG. 8E, if at least one external object among a seventh external object 840 and an eighth external object 842 related to the sixth type of gesture is included in the first sub-region 802, the processor 211 may determine that the plurality of external objects 840 and 842 related to the sixth type of gesture is not included in the second sub-region 804. According to an embodiment, referring to FIG. 8F, if a ninth external object 850 and a tenth external object 852 related to the sixth type of gesture are included in the first sub-region 802 of the gesture recognition region 800, the processor 211 may determine that the plurality of external objects 850 and 852 related to the sixth type of gesture is not included in the second sub-region 804.

According to various embodiments, if a plurality of external objects related to a gesture is detected in the second sub-region of the gesture recognition region (e.g., "YES" in operation 707), the electronic device (e.g., the processor 120 or 210 or the display device 215) may output a second visual effect related to the gesture in operation 709. According to an embodiment, referring to FIG. 8D, if the motion of the fifth external object 830 and the sixth external object 832 related to the sixth type of gesture included in the second group is detected in the second sub-region 804, the processor 211 may control the display device 215 to output second visual effects 834 and 836 related to the sixth type of gesture to the region determined as the field of view of the user 200 (e.g., the second sub-region 804). For example, the display device 215 may output the second visual effects 834 and 836 to be viewed so as to be superimposed on at least a portion of the fifth external object 830 and the sixth external object 832 in the real space that the user wearing the electronic device 210 is viewing through the display device 215. As an example, the second visual effects 834 and 836 may include a virtual object related to recognition of a gesture or a virtual object related to execution of a function mapped to the gesture.

According to various embodiments, if a plurality of external objects related to the gesture is not detected in the second sub-region of the gesture recognition region (e.g., "NO" in operation 707), the electronic device (e.g., the processor 120 or 210 or the display device 215) may output guide information related to the gesture in operation 711. As an example, the guide information may include a virtual object related to locational movement of an external object related to the gesture.

According to various embodiments, the electronic device 210 may execute a function mapped to a gesture included in the first group or detected in the second sub-region. According to an embodiment, referring to FIG. 8B, if a fifth type of gesture included in the first group is detected, the processor 211 may change the operation mode of the electronic device 210 into a mode mapped to the fifth type of gesture, based on a "mode change" function mapped to the fifth type of gesture. According to an embodiment, referring to FIG. 8D, if a sixth type of gesture is detected in the second sub-region 804, the processor 211 may increase the size of a virtual object selected by the sixth type of gesture, based on an "enlargement" function mapped to the sixth type of gesture. As an example, the magnification of the virtual object may be determined based on motion distances of the fifth external object 830 and/or the sixth external object 832 related to the sixth type of gesture.

Figure 9:
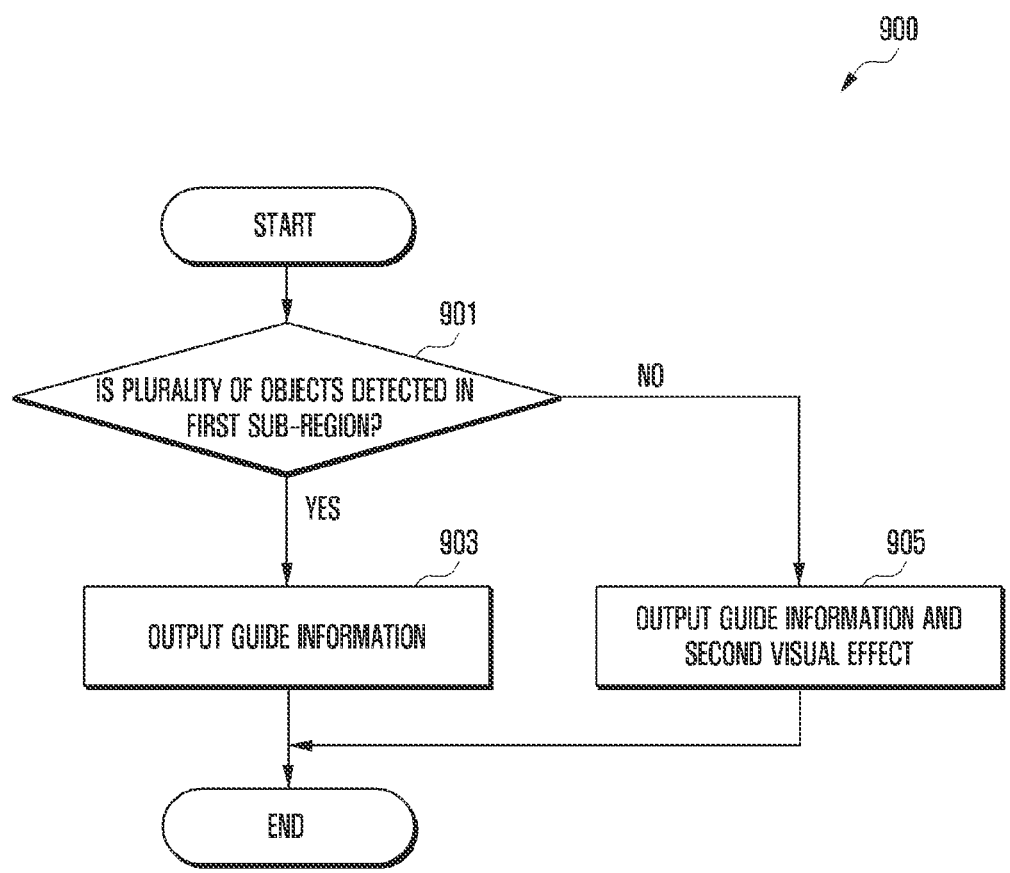
FIG. 9 is a flowchart illustrating selective output of guide information, based on a location of a gesture in an electronic device, according to various example embodiments.

FIG. 9 is a flowchart 900 illustrating selective output of guide information, based on a location of a gesture in an electronic device, according to various embodiments. According to an embodiment, operations in FIG. 9 may be detailed operations of operation 711 in FIG. 7. Operations in the following embodiment may be sequentially performed, but are not necessarily sequentially performed. For example, the sequence of the operations may vary, and at least two operations may be performed in parallel. As an example, the electronic device in FIG. 9 may be the electronic device 101 in FIG. 1 or the electronic device 210 in FIG. 2A or 2B.

Referring to FIG. 9, according to various embodiments, an electronic device (e.g., the processor 120 in FIG. 1, the camera module 180 in FIG. 1, the processor 211 in FIG. 2, or the camera module 213 in FIG. 2) may identify whether or not a plurality of external objects related to a gesture included in the second group among a plurality of specified groups is detected in the first sub-region in operation 901. According to an embodiment, referring to FIG. 8E, if at least one external object among a seventh external object 840 and an eighth external object 842 related to the sixth type of gesture is included in the first sub-region 802, the processor 211 may determine that a plurality of external objects 840 and 842 related to the sixth type of gesture is not included in the first sub-region 802. According to an exemplary embodiment, referring to FIG. 8F, if a ninth external object 850 and a tenth external object 852 related to the sixth type of gesture is included in the first sub-region 802 of the gesture recognition region 800, the processor 211 may determine that a plurality of external objects 850 and 852 related to the sixth type of gesture is included in the first sub-region 802.

According to various embodiments, if a plurality of external objects related to a gesture is detected in the first sub-region of the gesture recognition region (e.g., "YES" in operation 901), the electronic device (e.g., the processor 120 or 210 or the display device 215) may output guide information related to the gesture in operation 903. According to an embodiment, referring to FIG. 8F, if motions of the ninth external object 850 and the tenth external object 852 related to the sixth type of gesture included in the second group are detected in the sub-region 802, the processor 211 may control the display device 215 to output guide information 854 and 856 related to the sixth type of gesture to the region determined as the field of view of the user 200 (e.g., the second sub-region 804). For example, the display device 215 may output the guide information 854 and 856 to be viewed so as to be added to at least a portion of the real space that the user 200 wearing the electronic device 210 is viewing through the display device 215. As an example, the guide information 854 and 856 may be output (or displayed) onto at least a partial region relatively close to the detection point of the ninth external object 850 and/or the tenth external object 852 within the region determined as the field of view of the user 200 (e.g., the second sub-region 804). As an example, first guide information 854 may include a virtual object related to the locational movement of the ninth external object 850, and second guide information 856 may include a virtual object related to the locational movement of the tenth external object 852.

According to various embodiments, if a plurality of external objects related to a gesture is not detected in the first sub-region of the gesture recognition region (e.g., "NO" in operation 901), the electronic device (e.g., the processor 120 or 210 or the display device 215) may output guide information related to the gesture and a second visual effect in operation 905. According to an embodiment, referring to FIG. 8E, if the seventh external object 840 related to the sixth type of gesture included in the second group is detected in the first sub-region 802 and if the eighth external object 842 is detected in the second sub-region 804, the processor 211 may control the display device 215 to output guide information 844 related to the sixth type of gesture and a second visual effect 842 to the region determined as the field of view of the user 200 (e.g., the second sub-region 804). For example, the display device 215 may output guide information 844 related to the seventh external object 840 to at least a partial region relatively close to the detection point of the seventh external object 840 within the region determined as the field of view of the user 200 (e.g., the second sub-region 804). For example, the display device 215 may output a second visual effect 846 related to the eighth external object 842 so as to be viewed so as to be superimposed on at least a portion of the eighth external object 842 in the real space that the user wearing the electronic device 210 is viewing through the display device 215.

According to various embodiments, the electronic device 210 may determine the location where a gesture is detected based on the location of an external object related to the gesture. According to an embodiment, the processor 211 may determine the location where a gesture is detected based on a motion start point of an external object related to the gesture. For example, if the motion start location of an external object related to a gesture is included in the first sub-region, the processor 211 may determine that the corresponding gesture has been detected in the first sub-region, regardless of the location where the motion of the external object ends. For example, if the motion start location of the external object related to the gesture is included in the second sub-region, the processor 211 may determine that the corresponding gesture has been detected in the second sub-region, regardless of the location where the motion of the external object ends. According to an embodiment, the processor 211 may determine a location at which a gesture is detected based on a motion end point of an external object related to the gesture. For example, if the motion end location of an external object related to a gesture is included in the first sub-region, the processor 211 may determine that the corresponding gesture has been detected in the first sub-region, regardless of the location where the motion of the external object starts. For example, if the motion end location of the external object related to the gesture is included in the second sub-region, the processor 211 may determine that the corresponding gesture has been detected in the second sub-region, regardless of the location where the motion of the external object ends. As an example, the location where the motion of the external object ends may include the location of the external object corresponding to the time at which the gesture is recognized based on the motion of the external object.

According to various embodiments, an operation method of an electronic device (e.g., the electronic device 101 in FIG. 1 or the electronic device 210 in FIG. 2A or 2B) may include detecting a gesture, based on image information obtained through a camera module of the electronic device, identifying the gesture, based on the case where a detection location of the gesture is included in a first region different from a second region corresponding to a field of view of a user wearing the electronic device, among the image information obtained through the camera module, if the gesture corresponds to first gesture information, outputting a first visual effect related to the gesture, and if the gesture corresponds to second gesture information different from the first gesture information, outputting guide information related to the gesture.

According to various embodiments, the first visual effect may be displayed on at least a portion adjacent to the detection location of the gesture within a region corresponding to the user's field of view in a display region of the electronic device, and the second region may include at least a portion configured based on a region corresponding to the user's field of view of the display region, among the image information obtained through the camera module.

According to various embodiments, the guide information may include information related to a change in the location of an external object related to the gesture.

According to various embodiments, the identifying of the gesture may include determining that the gesture corresponds to the first gesture information if the gesture is included in a first group and determining that the gesture corresponds to the second gesture information if the gesture is included in a second group.

According to various embodiments, the first gesture information included in the first group may include at least one gesture to which a function executable in the first region and the second region is mapped, and the second gesture information included in the second group may include at least one gesture related to control of a virtual object.

According to various embodiments, the method may further include outputting a second visual effect related to the gesture, based on the case where the detection location of the gesture is included in the second region.

According to various embodiments, the second visual effect may be displayed on at least a portion of a display region of the electronic device configured based on a location of an external object related to the gesture.

According to various embodiments, the method may further include executing an application program related to the gesture if the gesture corresponds to the first gesture information.

Example embodiments disclosed in this specification and drawings are merely provided by way of example to easily explain the technical content according to the example embodiments and help the understanding of the example embodiments, and are not intended to limit the scope of the example embodiments. Therefore, the scope of the various example embodiments should be construed to encompass all changes or modifications derived based on the technical idea of the various example embodiments, in addition to the embodiments disclosed herein. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a memory;
   a camera;
   a display; and
   processing circuitry operatively connected to the memory, the display, and the camera,
   wherein the processing circuitry is configured to:
   detect a gesture using image information obtained via the camera while a virtual object is displayed on the display;
   identify whether the gesture is detected in a second region corresponding to a region outside of a first region corresponding to a region inside of a field of view of a user wearing the electronic device, among the image information obtained via the camera;
   in response to detecting the gesture in the first region, output a first visual effect related to the virtual object based on the gesture via the display;
   in response to detecting the gesture in the second region, identify a function mapped to the detected gesture;
   in response to the detected gesture being mapped to a first function related to the virtual object, output guide information related to the gesture via the display; and
   in response to the detected gesture being mapped to a second function not related to the virtual object, output a second visual effect related to the second function.

2. The electronic device of claim 1, wherein the processing circuitry is configured to divide the image information obtained via the camera into the first region corresponding to the region inside of the field of view of the user wearing the electronic device and the second region corresponding to the region outside of the field of view of the user wearing the electronic device.

3. The electronic device of claim 1, wherein the processing circuitry is configured so that the first visual effect is to be displayed on at least a portion adjacent to the detection location of the gesture within a region corresponding to the user's field of view in a display region of the display, and
   wherein the guide information comprises information related to a change in the location of an external object related to the gesture.

4. The electronic device of claim 1, wherein the processing circuitry is configured to:
   execute an application program related to the second function based on mapping of the second function not related to the virtual object to the gesture identified to be in the second region, and
   output the second visual effect related to the executed application program.

5. The electronic device of claim 1, wherein the processing circuitry is further configured to:
   based on the gesture detected in the second region is related to motions of a plurality of external objects, identify detection locations of the plurality of external objects, and
   output the guide information related to the gesture via the display, based on the detection of locations of the plurality of external objects are included in the first region.

6. The electronic device of claim 5, wherein the processing circuitry is further configured to output guide information related to the gesture via the display, based on the detection of a location of at least one external object among the plurality of external objects is included in the second region.

7. A method of operating an electronic device, the method comprising:
   detecting a gesture using image information obtained via a camera of the electronic device while a virtual object is displayed on a display of the electronic device;
   identifying whether the gesture is detected in a second region corresponding to a region outside of the first region corresponding to a region inside of a field of view of a user wearing the electronic device, among the image information obtained via the camera;

in response to detecting the gesture in the first region, outputting a visual effect related to the gesture;

in response to detecting the gesture in the second region, identifying a function mapped to the detected gesture;

in response to the detected gesture being mapped to a first function related to the virtual object, outputting guide information related to the gesture; and in response to the detected gesture being mapped to a second function not related to the virtual object, outputting a second visual effect related to the second function.

8. The method of claim 7, wherein the first visual effect is displayed on at least a portion adjacent to the detection location of the gesture within a region corresponding to the user's field of view in a display region of the electronic device, and wherein the first region comprises at least a portion configured based on a region corresponding to the user's field of view of the display region, among the image information obtained via the camera.

9. The method of claim 7, wherein the guide information comprises information related to a change in the location of an external object related to the gesture.

10. The method of claim 7, further comprising dividing the image information obtained via the camera into the first region corresponding to the region inside of the field of view of the user wearing the electronic device and the second region corresponding to the region outside of the field of view of the user wearing the electronic device.

11. The method of claim 7, wherein the outputting the second visual effect comprises:

executing an application program related to second function based on mapping of the second function not related to the virtual object to the gesture identified to be in the second region; and outputting the second visual effect related to the executed application program.

* * * * *